US012641067B2

(12) United States Patent
Soon-Shiong

(10) Patent No.: US 12,641,067 B2
(45) **Date of Patent: \*May 26, 2026**

(54) CONTENT ACTIVATION VIA INTERACTION-BASED AUTHENTICATION, SYSTEMS AND METHOD

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/664,216

(22) Filed: May 14, 2024

(65) Prior Publication Data

US 2024/0305618 A1 Sep. 12, 2024

Related U.S. Application Data

(60) Division of application No. 17/950,998, filed on Sep. 22, 2022, now Pat. No. 12,015,601, which is a
(Continued)

(51) Int. Cl.
*H04L 9/40* (2022.01)
*G06F 9/455* (2018.01)
(Continued)

(52) U.S. Cl.
CPC .......... *H04L 63/08* (2013.01); *G06F 9/45533* (2013.01); *G06F 21/10* (2013.01); *G06F 21/35* (2013.01); *G06Q 30/0207* (2013.01)

(58) Field of Classification Search
None
See application file for complete search history.

(56) References Cited

U.S. PATENT DOCUMENTS 5,974,150 A 10/1999 Kaish et al.
6,119,229 A \* 9/2000 Martinez ................. A63F 13/12
726/28
(Continued)

FOREIGN PATENT DOCUMENTS

CN 1767437 A 5/2006
CN 1834989 A 9/2006
(Continued)

OTHER PUBLICATIONS

"Invoked Computing: spatial audio and video AR invoked though miming", Ishikawa Oku Laboratory, Screencapture Dec. 6, 2011, http://www.k2.t.u-tokyo.ac.jp/perception/invokedComputing/index-e.html.
(Continued)

*Primary Examiner* — Farid Homayounmehr
*Assistant Examiner* — Suman Debnath
(74) *Attorney, Agent, or Firm* — MASCHOFF BRENNAN; Andrew A. Noble

(57) ABSTRACT

Systems, methods, and use-cases of multi-modal authentications and content distribution are presented. A content consumer can capture a multi-modal digital representation of multiple objects where a juxtaposition of features derived from the digital representation can be used to recognize that at least some of the objects are a valid authentication object. Upon authentication, an authentication agent determines a content access level for content associated with the corresponding to the juxtaposition. The content can then be presented on an electronic device, possibly within a secure virtual machine, according to the content access level.

22 Claims, 6 Drawing Sheets

Related U.S. Application Data continuation of application No. 17/071,715, filed on Oct. 15, 2020, now Pat. No. 11,503,007, which is a continuation of application No. 16/544,640, filed on Aug. 19, 2019, now Pat. No. 10,841,292, which is a division of application No. 14/381,164, filed as application No. PCT/US2013/025366 on Feb. 8, 2013, now Pat. No. 10,432,601.

(60) Provisional application No. 61/603,049, filed on Feb. 24, 2012.

(51) Int. Cl.
| | | |
|---|---|---|
| *G06F 21/10* | (2013.01) | |
| *G06F 21/35* | (2013.01) | |
| *G06Q 30/0207* | (2023.01) | |

(56) References Cited

U.S. PATENT DOCUMENTS

| | | | |
|---|---|---|---|
| 6,377,296 | B1 | 4/2002 | Zlatsin et al. |
| 6,687,390 | B2 | 2/2004 | Avni et al. |
| 6,978,369 | B2 | 12/2005 | Wheeler et al. |
| 7,016,532 | B2 | 3/2006 | Boncyk et al. |
| 7,181,617 | B2 | 2/2007 | Wise et al. |
| 7,283,973 | B1 | 10/2007 | Loghmani et al. |
| 7,380,280 | B2 | 5/2008 | De Jong |
| 7,398,557 | B2 | 7/2008 | De Jong |
| 7,403,652 | B2 | 7/2008 | Boncyk et al. |
| 7,477,780 | B2 | 1/2009 | Boncyk et al. |
| 7,565,008 | B2 | 7/2009 | Boncyk et al. |
| 7,680,324 | B2 | 3/2010 | Boncyk et al. |
| 7,685,417 | B2 | 3/2010 | Wise et al. |
| 7,715,600 | B2 | 5/2010 | Avni et al. |
| 7,881,529 | B2 | 2/2011 | Boncyk et al. |
| 7,899,243 | B2 | 3/2011 | Boncyk et al. |
| 7,899,252 | B2 | 3/2011 | Boncyk et al. |
| 7,953,079 | B2 | 5/2011 | John et al. |
| 7,995,196 | B1 | 8/2011 | Fraser |
| 8,078,538 | B1 | 12/2011 | Buch et al. |
| 8,151,344 | B1 | 4/2012 | Channakeshava |
| 8,194,938 | B2 | 6/2012 | Wechsler et al. |
| 8,224,293 | B1 | 7/2012 | Knapp et al. |
| 8,245,922 | B2 | 8/2012 | Gerigk et al. |
| 8,756,672 | B1 * | 6/2014 | Allen .................... G06F 21/36 726/19 |
| 9,007,473 | B1 | 4/2015 | Worley et al. |
| 9,681,359 | B2 * | 6/2017 | Ramalingam ........... H04W 4/02 |
| 10,432,601 | B2 | 10/2019 | Soon-Shiong |
| 10,841,292 | B2 | 11/2020 | Soon-Shiong |
| 11,503,007 | B2 | 11/2022 | Soon-Shiong |
| 12,015,601 | B2 | 6/2024 | Soon-Shiong |
| 2002/0008789 | A1 | 1/2002 | Harris et al. |
| 2004/0088551 | A1 | 5/2004 | Dor et al. |
| 2004/0103038 | A1 | 5/2004 | Power et al. |
| 2005/0154643 | A1 | 7/2005 | Doan et al. |
| 2005/0240959 | A1 | 10/2005 | Kuhn et al. |
| 2005/0289590 | A1 | 12/2005 | Cheok et al. |
| 2006/0002607 | A1 | 1/2006 | Boncyk et al. |
| 2006/0028429 | A1 | 2/2006 | Kanevsky et al. |
| 2006/0080316 | A1 | 4/2006 | Gilmore et al. |
| 2006/0209326 | A1 | 9/2006 | Higashiura |
| 2006/0271520 | A1 | 11/2006 | Ragan |
| 2007/0121174 | A1 | 5/2007 | Higashiura |
| 2007/0143230 | A1 | 6/2007 | Narainsamy et al. |
| 2007/0178883 | A1 | 8/2007 | Nandagopal |
| 2008/0020845 | A1 | 1/2008 | Low et al. |
| 2008/0035725 | A1 | 2/2008 | Jambunathan et al. |
| 2008/0174547 | A1 | 7/2008 | Kanevsky et al. |
| 2008/0263048 | A1 | 10/2008 | Wise |
| 2009/0106788 | A1 | 4/2009 | Nochimowski |
| 2009/0119764 | A1 * | 5/2009 | Applewhite ........ H04L 63/0853 726/9 |
| 2009/0132813 | A1 | 5/2009 | Schibuk |

| | | | |
|---|---|---|---|
| 2009/0327130 | A1 | 12/2009 | Labaton |
| 2010/0169642 | A1 | 7/2010 | Wise et al. |
| 2010/0325716 | A1 | 12/2010 | Hong et al. |
| 2010/0332329 | A1 | 12/2010 | Roberts et al. |
| 2011/0061100 | A1 * | 3/2011 | Mattila ................... G06F 21/36 345/173 |
| 2011/0143663 | A1 | 6/2011 | Renard et al. |
| 2011/0161076 | A1 | 6/2011 | Davis et al. |
| 2011/0161232 | A1 | 6/2011 | Brown |
| 2011/0208659 | A1 | 8/2011 | Easterly et al. |
| 2011/0208797 | A1 | 8/2011 | Kim |
| 2011/0225069 | A1 * | 9/2011 | Cramer .................. G06Q 30/06 705/26.1 |
| 2011/0231909 | A1 | 9/2011 | Shibuya |
| 2011/0300941 | A1 | 12/2011 | Weston et al. |
| 2011/0311112 | A1 | 12/2011 | Matsuyama et al. |
| 2011/0321125 | A1 | 12/2011 | Kyohgoku et al. |
| 2012/0077476 | A1 | 3/2012 | Paraskevakos et al. |
| 2012/0163672 | A1 | 6/2012 | Mckinnon |
| 2012/0190455 | A1 | 7/2012 | Briggs |
| 2012/0200601 | A1 | 8/2012 | Osterhout et al. |
| 2012/0252359 | A1 | 10/2012 | Adams et al. |
| 2012/0278241 | A1 | 11/2012 | Brown et al. |
| 2012/0293325 | A1 | 11/2012 | Lahcanski et al. |
| 2013/0004033 | A1 | 1/2013 | Trugenberger |
| 2021/0029104 | A1 | 1/2021 | Soon-Shiong |

FOREIGN PATENT DOCUMENTS

| | | |
|---|---|---|
| CN | 101151898 A | 3/2008 |
| CN | 102137084 A | 7/2011 |
| CN | 102281348 A | 12/2011 |
| CN | 102317949 A | 1/2012 |
| EP | 2348443 A2 | 7/2011 |
| EP | 2348458 A1 | 7/2011 |
| EP | 2348458 B1 | 11/2012 |
| JP | 2005-202653 A | 7/2005 |
| JP | 2006-261832 A | 9/2006 |
| JP | 2007-150583 A | 6/2007 |
| JP | 2008-503113 A | 1/2008 |
| JP | 4164737 B2 | 10/2008 |
| KR | 10-2009-0014878 A | 2/2009 |
| KR | 10-2011-0068545 A | 6/2011 |
| WO | 01/41360 A2 | 6/2001 |
| WO | 2007/130688 A2 | 11/2007 |
| WO | 2009/034696 A1 | 3/2009 |
| WO | 2010/038763 A1 | 4/2010 |
| WO | 2011/002550 A1 | 1/2011 |
| WO | 2012/085378 A1 | 6/2012 |

OTHER PUBLICATIONS

"Pay-Pal's Security Key-More Protection for Your Account", PayPal, Screencapture Feb. 26, 2013, https://www.paypal.com/us/cgi-bin?cmd=xpt/Marketing_CommandDriven/securitycenter/PayPalSecurityKey-outside&bn_r=o.

European Search Report and Search Opinion received for European Application No. 17174182.0, mailed on Aug. 8, 2017, 5 pages.

European Search Report and Search Opinion received for European Application No. 18186219.4, mailed on Aug. 27, 2018, 9 pages.

First Office Action and Search Report issued in Chinese Applicant No. 201710441086.5 dated Jul. 20, 2020, 10 pages.

International Preliminary Report on Patentability received for PCT Patent Application No. PCT/US2013/025366, mailed on Sep. 4, 2014, 6 pages.

International Search Report and Written Opinion received for PCT Patent Application No. PCT/US2013/025366, mailed on May 30, 2013, 8 pages.

Notice of Allowance and Search Report issued in Chinese Applicant No. 201710441086.5 dated Nov. 3, 2020, 6 pages.

Notice of Reasons for Rejection issued in Japanese Patent Application No. 2014-558757 dated Oct. 13, 2015, 4 pages.

Office Action and Examination Search Report issued in Canadian Patent Application No. 2,868,771 dated Aug. 3, 2015, 6 pages.

Office Action and Examination Search Report issued in Canadian Patent Application No. 2,868,771 dated Dec. 15, 2014, 4 pages.

(56)                    References Cited

OTHER PUBLICATIONS

Office Action issued in Canadian Patent Application No. 2,868,771 dated Apr. 6, 2016, 5 pages.

Office Action issued in Canadian Patent Application No. 2,868,771 dated Aug. 24, 2017, 4 pages.

Office Action issued in Chinese Patent Application No. 201380021303.5 dated Jul. 27, 2016, 23 pgs.

Office Action issued in Indian Patent Application No. 7884/DELNP/2014 dated Jul. 2, 2019, 6 pages.

Office Action received for European Application No. 13752027.6, mailed on Jul. 1, 2016, 5 pages.

Owano, Nancy, "Invoked computing: Pizza box is too loud! I can't hear the banana", Physorg.com, Screencapture Dec. 6, 2011, http://www.physorg.com/print241161430.html.

Patent Examination Report No. 1 issued in Australian Patent Application No. 2013222780 dated May 15, 2015, 3 pages.

Supplementary European Search Report and Search Opinion received for European Application No. 13752027.6, mailed on Sep. 4, 2015, 8 pages.

Tiwari et al. "A Multi-Factor Security Protocol for Wireless Payment-Secure Web Authentication Using Mobile Devices," IADIS International Conference Applied Computing, 2007, 8 pages.

Willis, Nathan, "Google Authenticator for multi-authentication" LWN.net, Dec. 7, 2011, http://lwn.net/Articles470764/.

Zerroug et al., "Invoked Computing: Spatial audio and video AR invoked through miming," Proceedings of Virtual Reality International Conference, Apr. 6-8, 2011, 2 pages.

* cited by examiner

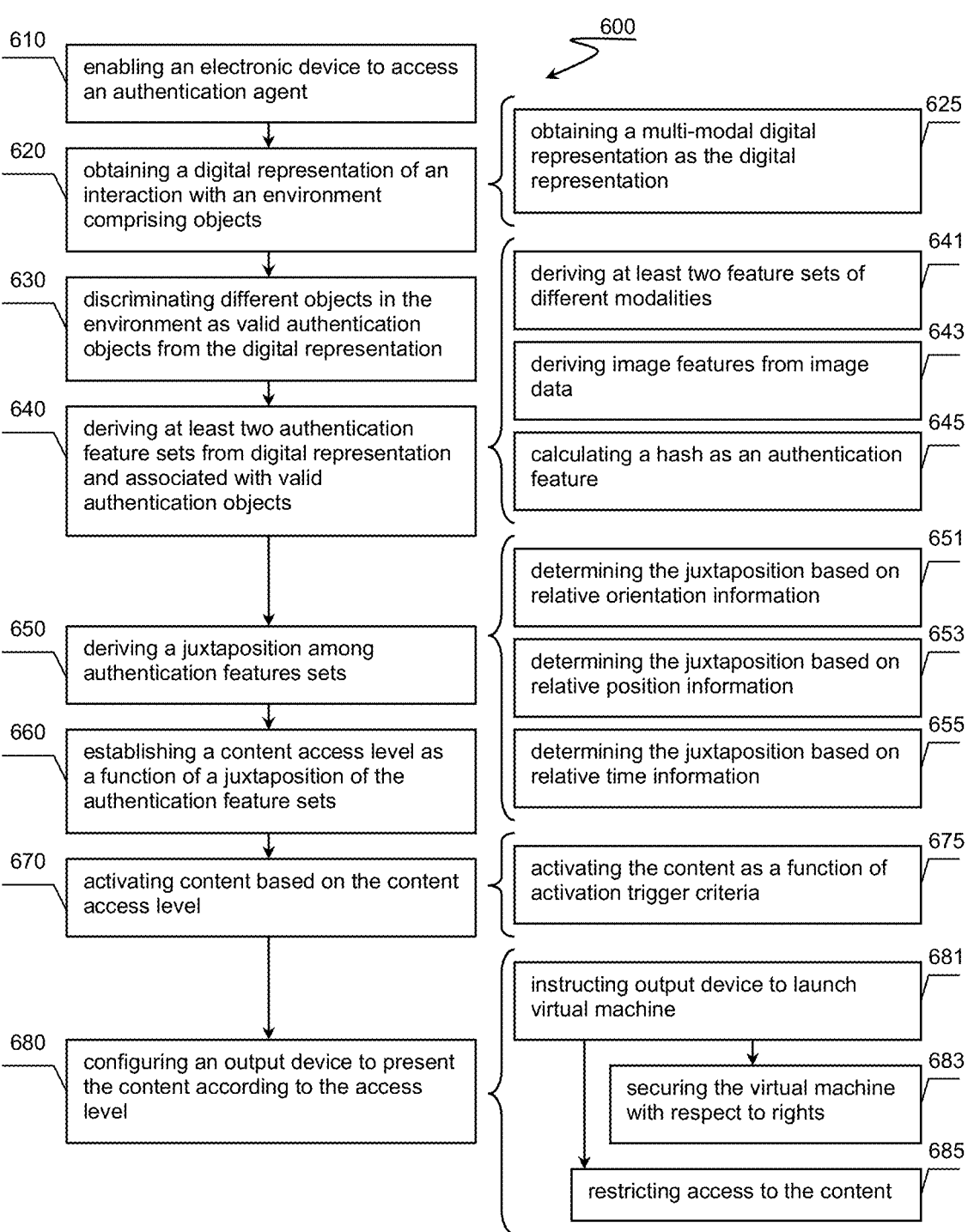

610 — enabling an electronic device to access an authentication agent

600

620 — obtaining a digital representation of an interaction with an environment comprising objects 625 — obtaining a multi-modal digital representation as the digital representation 630 — discriminating different objects in the environment as valid authentication objects from the digital representation 641 — deriving at least two feature sets of different modalities 643 — deriving image features from image data 640 — deriving at least two authentication feature sets from digital representation and associated with valid authentication objects 645 — calculating a hash as an authentication feature 651 — determining the juxtaposition based on relative orientation information 653 — determining the juxtaposition based on relative position information 650 — deriving a juxtaposition among authentication features sets 655 — determining the juxtaposition based on relative time information 660 — establishing a content access level as a function of a juxtaposition of the authentication feature sets 675 — activating the content as a function of activation trigger criteria 670 — activating content based on the content access level 681 — instructing output device to launch virtual machine 683 — securing the virtual machine with respect to rights 680 — configuring an output device to present the content according to the access level 685 — restricting access to the content

Figure 6

CONTENT ACTIVATION VIA INTERACTION-BASED AUTHENTICATION, SYSTEMS AND METHOD

This application is a division of U.S. application Ser. No. 17/950,998 filed on Sep. 22, 2022, which is a continuation of U.S. application Ser. No. 17/071,715 filed on Oct. 15, 2020, which is a continuation of U.S. application Ser. No. 16/544,640 filed on Aug. 19, 2019, is a division of U.S. application Ser. No. 14/381,164 filed on Aug. 26, 2014, which is a National Phase of International Application No. PCT/US2013/025366 filed on Feb. 8, 2013, which claims priority to U.S. Provisional Application No. 61/603,049 filed Feb. 24, 2012. The entire contents of these applications are hereby incorporated herein by reference.

FIELD OF THE INVENTION

The field of the invention is content distribution technologies.

BACKGROUND

The following description includes information that may be useful in understanding the present invention. It is not an admission that any of the information provided herein is prior art or relevant to the presently claimed invention, or that any publication specifically or implicitly referenced is prior art.

The amount of content that is distributed over networks to electronic devices continues to grow at an alarming rate as driven by content consumers seeking to satisfy their insatiable need for content. Unfortunately, content consumers are not always entitled to the content they desire. Further, content providers often lack control over the distribution of the content in a manner that ensures the provider's rights are protected. The conflict between content demand and content rights results in frustration of the consumers and the providers. What is needed is an infrastructure that allows content to be ever-present while only allowing the content to be distributed to individuals upon valid authentication. Interestingly, it has yet to be appreciated that everyday objects, or objects relative to each other, can be used as a key to activate content in a controlled manner that protects rights of the content providers and satisfies consumer demand for immediate gratification of content. Even further, it has yet to be appreciated that everyday objects can be used to gain access to different levels of content, which could give rise to more dynamic object interactions.

Some effort has been directed to linking brands to social forms of television. For example, Second Screen Networks™ (see URL www.secondscreen.com) allows content providers to send advertisements to a user's second screen (e.g., a cell phone) when corresponding content is presented on television. However, such an approach fails to address a consumer's demand for content at any point in time away from a television. Further, the Second Screen approach requires the consumer to opt into the system rather than offer access to a pervasive layer of ever present content.

Additional effort has been directed toward using biometric recognition techniques as a basis for establishing a person's identity as part of authentication systems. For example, European patent application specification EP 2 348 458 to Murakami et al. titled "Biometric Authentication System", filed Sep. 3, 2010, describes using biometric features to determine user identify based on biometric authentication. In addition, U.S. patent application publication 2011/0311112 to Matsuyama et al. titled "Identification Device, Identification Method, and Storage Medium", filed Jun. 16, 2011, discloses identifying a person based on feature data extracted from image frames of the person's face. When specific feature data in subsequent frames has not been identified, the feature data is associated with the face area of the subsequent frames. Still, further U.S. Pat. No. 8,194,938 to Wechsler et al. titled "Face Authentication Using Recognition-by-Parts, Boosting, and Transduction", filed Jun. 1, 2010, describes authenticating a person's face through comparing captured image "patches" of the person's face to known patches where the patches can be extracted via SIFT or Gabor wavelets. Interestingly, each of the disclosed techniques requires a priori understanding of the biometric features, and is not suited for use with respect to unrestricted classes of objects.

Still, there are techniques available that offer at least a minimal path forward with respect to identifying or recognizing different classes of objects beyond just identifying a priori known classes of biometric features. For example, Japanese patent abstract for JP4164737 to Yokono titled "Object Recognition Device, Object Recognition Method, and Robot Equipment" (en), filed May 24, 2002, describes a learning system for robots where a robot learns to recognize an unknown object by placing the unknown object in a predetermined position relative to the imaging apparatus. Additionally, Japanese patent abstract for JP2005202653 to Matsugi et al. titled "Behavior Recognition Device and Method, Animal Object Recognition Device and Method, Equipment Control Device and Method, and Program" (en), filed Jan. 15, 2004, discusses recognizing objects based on primitive features. The primitive features can be observed over a period of time in order to generate an output behavior category.

Image based recognition includes co-owned U.S. Pat. No. 7,016,532, titled "Image Capture and Identification System and Process", filed Sep. 5, 2001; U.S. Pat. No. 7,680,324, titled "Use of Image-Derived Information as Search Criteria for Internet and other Search Engines", filed Aug. 15, 2005; U.S. Pat. No. 7,565,008, titled "Data Capture and Identification System and Process", filed Jan. 26, 2006; and U.S. Pat. No. 7,477,780, titled "Data Capture and Identification System and Process", filed Mar. 22, 2004, all to Boncyk et al. Boncyk describes calculating salient parameters from image data of an object, then using the parameters to look up images of known objects in a database.

The above references, at least at some level, allow for recognizing or identifying objects, but fail to address authenticating a user or authorizing access to content according to different access levels based on different forms of data capture.

Other work has been directed toward using different data capture techniques to authenticate users. For example, U.S. Pat. No. 6,687,390 to Avni et al. titled "System for and Method of Web Signature Recognition System Based on Object Map", filed Dec. 4, 2001, discloses validating an identify of a user based on how the user moves a pointing device on a computer to manipulate a cursor on a background graphic image.

Even further work has been directed toward authenticating physical objects a non-counterfeit. U.S patent 5,974,150 to Kaish et al. titled "System and Method for Authentication of Goods", filed Jul. 6, 1998, describes using position of a plurality of elements (e.g., diachronic fibers) disposed in an irregular pattern in a medium (e.g., paper) to authenticate products as being real rather than counterfeit. In a similar vein to Kaish, U.S. Pat. No. 7,995,196 to Fraser titled "Authentication Method and System", filed Apr. 21, 2009, also attempts to provide techniques for authenticating objects based on a physical dispersion pattern of a set of elements (e.g., fibers) on a substrate. U.S. Pat. No. 8,245,922 to Gerigk et al. titled "Method and Device for Identifying and Authenticating Objects", filed Nov. 19, 2010, also describes authenticating objects. Gerigk describes encoding an object with a code in a code region, which scatters electromagnetic radiation. Although these references provide utility with respect to authentication per se, they fail to appreciate that content could have different access levels.

One example of a technique to provide access to content includes U.S. Pat. No. 7,283,973 to Loghmani et al. titled "Multi-Modal Voice-Enable Content Access and Delivery System", filed Oct. 29, 2002. Loghmani describe using speech recognition or DTMF tones to allow a user to access content over a phone. Further progress toward granting authorization to access content is describe in U.S. Pat. No. 7,380,280 to de Jong titled "Rights Locker for Digital Content Access Control", filed Oct. 15, 2003. de Jong suggests using a token management system approach to restrict access to content. Even further, U.S. Pat. No. 7,953,079 to John et al. titled "Method and Apparatus to Control Access to Content", filed Jun. 4, 2007, describes providing access to content based on a content access policy where the content is classified by type, possibly through the use of speech recognition, text recognition, or image processing tools. Yet further, U.S. patent application publication to Roberts et al. titled "Methods and Systems for Controlling Presentation of Media Content Based on User Interaction", filed Jun. 30, 2009, discusses monitoring a user to determining if they are actively or passively interacting with media content. Content is presented to the user based on an interaction profiles.

The references discussed above thus far fail to provide for increased security through allowing a user to utilize an object as an authorization key. However, International application abstract WO 2012/085378 to Fondeur et al. titled "Method for Enabling Authentication of Identification, and Related Verification Systems", filed Nov. 29, 2011, describes capturing an image of an object that is secretly selected by a person where the image of the object is used to register the person with a system. Fonduer merely contemplates using an image of an object for user registration and does not provide for using different modalities for authorization. Still, U.S. patent application 2011/0161232 to Brown titled "Virtualization of Authentication Token for Secure Applications", filed Dec. 28, 2009, makes even further progress. Brown discusses collecting images of physical keys (e.g., car keys, house keys, etc.) or other physical tokens, as part of a "what-you-have" type of authentication. Brown describes that the images of the physical tokens can be combined with a voice print, a "what-you-are" authentication factor, to create a stronger multi-factor authentication protocol. Unfortunately, the Brown system simply merely describes use of multiple keys without regarding to relative arrangement.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

A more ideal system would provide for authenticating or authorizing an entity to access various levels of content based on a juxtaposition of the objects relative to each other rather than merely existence of an object as a security token. Such an approach, as described below in the applicant's work, is advantageous by offering plausible deniability, fine grained access or control, or other access level features while allowing a content provider to retain control over their content.

Thus, there is still a need for content activation and authentication systems and methods.

SUMMARY OF THE INVENTION

The inventive subject matter provides apparatus, systems and methods in which one can activate content based on recognizing that actual objects in an environment or scene can be considered authentication objects with respect gaining access to content. One aspect of the inventive subject matter includes methods of activating content. An electronic device can access an authentication agent capable of granting access to content. In some embodiments, the electronic device obtains a digital representation, possibly a multi-modal representation, of an interaction (e.g., dialog, imaging, working, playing, sensing, monitoring, etc.) with at least one physical object to a recognition engine, possibly operating as the authentication agent. The method can further include discriminating at least two objects in the environment as valid authentication objects based on the digital representation where the valid authentication objects can be discriminated from other objects that are not related to authentication. The method can further include deriving authentication feature sets related to the valid authentication objects where the authentication features can be determined from the digital representation of the physical object. Example authentication features can include a hash code calculated from image or audio data, Scale Invariant Feature Transform (SIFT) features, audio signatures, locations, time, or other aspects associated with the digital representation. Another step of the method includes establishing, possibly by the authentication agent, a content access level as a function of a juxtaposition of the authentication features sets relative to each other in an interaction space where the attributes of the juxtaposition can be used as an index into a content or access level database. The authentication agent is then able to activate content associated with the physical object by configuring the electronic device to present or render the content according to the content access level.

Another aspect of the inventive subject matter includes a content distribution system that comprises an authentication object database, a recognition platform, and an authentication agent. Preferably the authentication object database stores multiple authentication elements where each element can represent an object, real or virtual, that can be used by individuals as an authentication key. For example, a person could register a house plant as their authentication element. Each authentication element preferably comprises one or more authentication features that are considered valid features by which the element can be used for authentication; front of an action figure toy versus back of an action figure toy for example. The recognition platform obtains or otherwise acquires a digital representation of a scene having one or more objects. The platform analyzes the digital representation to identify the objects through derivation of one or more object features. The platform is further configured to recognize at least one of the objects in the scene as an authentication element associated with the user based on a comparison of the object features to the authentication features of the element. The authentication agent can use the authentication features present in the scene to derive content access levels, which can used to authorize content that can be presented on an electronic device.

Yet another aspect of the inventive subject matter includes methods for obtaining product information. The methods can include providing access to a recognition server, possibly operating as a search engine, an on-line retailer, or other service. The recognition server can obtain a captured video frame from a video stream. For example, an individual can capture a still image of a television show, commercial, or movie where the still image represents the captured video frame. The recognition server can be further configured to derive features associated with the frame and to identify at least one originating video stream from which the frame was captured based on the features. Once the video stream has been identified, the method can further include obtaining product information associated with the identified video stream from a product database. The product information can be presented on an electronic device.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 6 is a schematic of a method for activity content.

DETAILED DESCRIPTION

It should be noted that while the following description is drawn to a computer/server based authentication or content distribution systems, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including generating one or more content activations signals to electronic devices. The activation signal configures the electronic device to be enabled to present activated content. For example, the electronic device receives the activation signal over a network and in response the electronic device instantiates a virtual machine that is authorized to present content to a user according to the content access levels.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within a networking context as discussed in this document, the terms "coupled to" and "coupled with" can also mean "communicatively coupled with".

Overview

Figure 1:
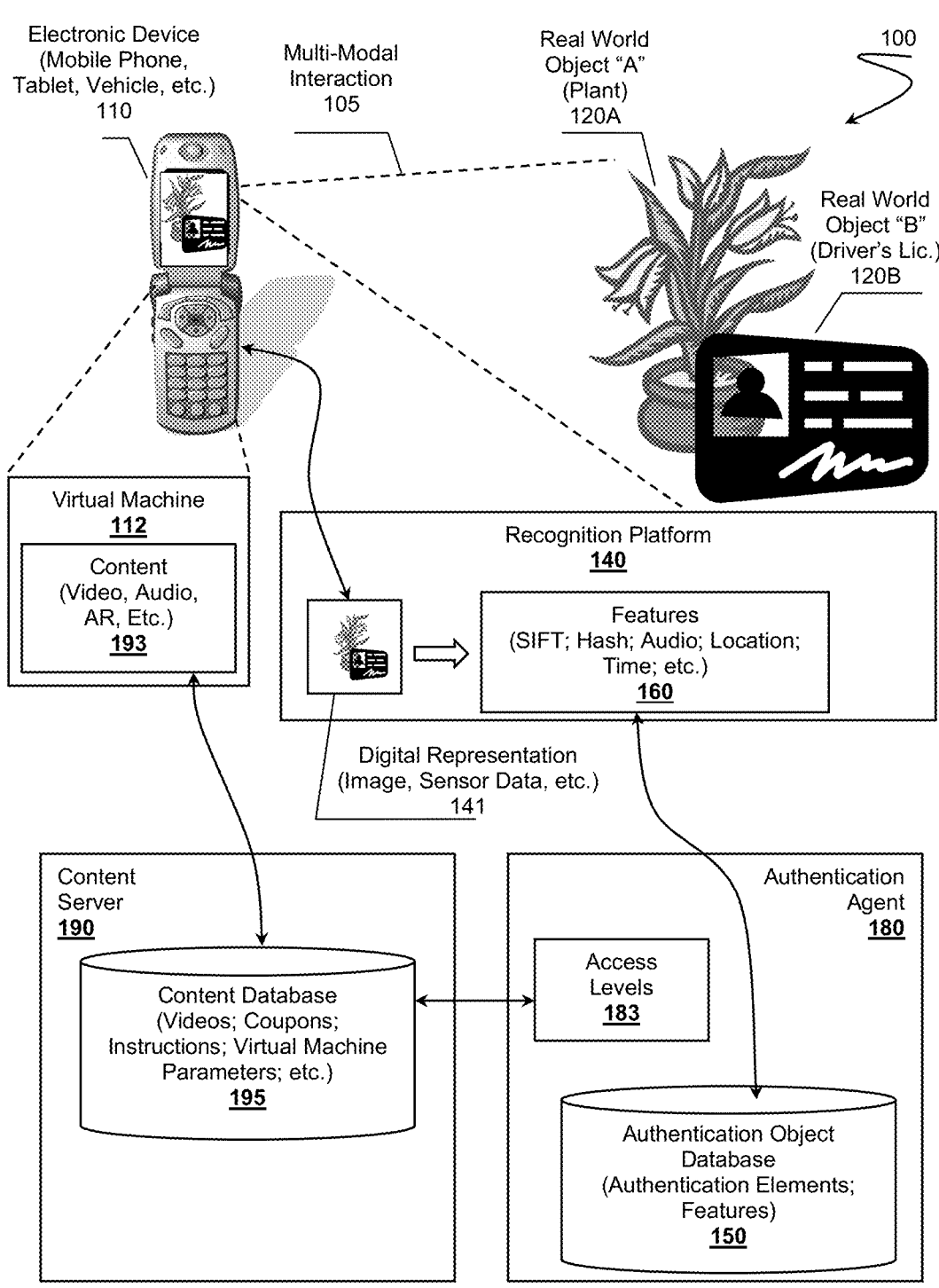
FIG. 1 is a schematic of multi-modal transmedia authentication and content distribution ecosystem.

FIG. 1 illustrates an authentication and content distribution ecosystem. In the example shown, content is activated based on authenticating a user or device as a function of a multi-modal interaction 105 with a scene 100. In some embodiments, the multi-modal interaction 105 includes taking an image of one or more real-world objects 120A or 120B from electronic device 110 (e.g., a cell phone, vehicle, etc.) as illustrated where electronic device 110 can also operate as an output device. Example electronic devices include a cell phone, a tablet computer, a computer, a game console, a vehicle, a kiosk, a vending machine, a robot, an electronic appliance, a medical device, a security system, or other device. One should appreciate that the multi-modal interactions 105 can cover broad spectrum of interactions and multi-modal data. Example interactions with the environment can include playing sports, walking, shopping, purchasing, imaging, collecting ambient data, monitoring, listening, playing, working, or other types of interactions. Interaction data can be obtained from one or more sensors that capture different modalities of data. Example modalities include video data, audio data, kinesthetic data, location data, time data, pressure data, temperature data, news data, or other types of data. The sensor data associated with the environment can be obtained via sensors in electronic device 110, a cell phone for example, (e.g., accelerometers, magnetometer, compass, microphone, GPS, radio, etc.) or via sensors in other distinct or remote devices (e.g., security camera, news sources, etc.).

The following discussion describes the inventive subject matter with respect to electronic device 110, a cell phone for example, capturing image data as digital representation 141 of one or more physical objects 120A through 120B within a physical environment. One should appreciate that the techniques disclosed below can be readily adapted to other modalities of data including sound, motion video, biometric data, location data, or other data that can be captured via sensors or otherwise obtained from data sources. Additionally, the presented example focuses on real-world physical objects 120A and 120B. However, authentication objects can also comprise virtual objects rendered on a computing system, a virtual object in an on-line game world for example, an augmented reality object, or other types of virtual objects.

In the example shown, electronic device 110 captures digital representation 141 as an image reflecting interaction 105 with a scene 100 comprising a plant (i.e., object 120A) and a document represented as a driver's license (i.e., object 120B). The plant and driver's license represent example real-world objects that can be used as a key to unlock content 193 or gain access to control over content 193. Interaction 105 can merely include capturing an image as well as more complex interactions. Example interactions 105 could include gardening, attending an appointment at a dentist office, shopping at a home improvement store, or other type of multi-modal interactions. Each interaction 105 can be determined by a sensor data signature as compared to known interactions in an interaction database (not shown) or through a user selected type of interaction.

Electronic device 110 obtains the image, or other digital representation 141, and can process the data as necessary. One should appreciate that digital representation 141 can include raw sensor data, processed sensor data (e.g., an image file), analyzed sensor data (e.g., reduced data set), or other information derived from the digital representation 141. The digital representation 141 can then be presented to recognition platform 140 configured to receive or otherwise obtain the digital representation 141. The digital representation can be transmitted over a network (e.g., WAN, LAN, Internet, cell network, etc.) to recognition platform 141 using known protocols (e.g., HTTP, FTP, SSL, SSH, etc.), or other proprietary protocols. In some embodiments, electronic device 110 comprises recognition platform 141. Further, it should be appreciated that each element of the disclosed system has roles or responsibilities that can be distributed across the ecosystem. For example, authentication agent 180 can be disposed within electronic device 110 or operating as a remove server that provides authentication services for a fee. Still further, the roles and responsibilities of a single element can be distributed across multiple devices within the ecosystem. For example content database 195 could have portions disposed within electronic device 110, in recognition platform 140, or even in remote third party services (e.g., a search engine, shopping site, etc.).

Recognition platform 140 receives digital representation 141 and attempts to identify objects 120A or 120B in the scene or environment 100 as represented in digital representation 141; the plant and driver's license for example. Recognition platform 140 can analyze digital representation 141 to extract one or more features 160 related to objects 120A or 120B. In some embodiments, features 160 can include object attributes associated with objects 120A or 120B. It is also contemplated that the features 160 can include attributes derived from the data of digital representation 141. With respect to images, features 160 could include Scale Invariant Feature Transform (SIFT), Binary Robust Invariant Scalable Keypoints (BRISK), Speeded Up Robust Features (SURF), or other types of features derived from the image data. In some embodiments, features 160 could include a hash value calculated from at least a portion of the image, or a portion of digital representation 141, even from other modalities. An acceptable hash can include a perceptual hash where the perceptual hash value is similar for similar content (see URL www.phash.org). Example perceptual hashes include fixed length MH image hash, Discrete Cosine Transform (DCT) variable length video hash, DCT image hash, radial image hash, histogram-based image hash, or bark audio hash. Features 160 could also include words or terms generated through Automatic Speech Recognition (ASR), biometric values (e.g., respiration, heart rate, blood pressure, facial features, etc.), location information (e.g., GPS, triangulation, inertial movement, non-GPS Iridium data, etc), or other attributes derived from many modalities.

Features 160 can also depend on the modality of the interaction data as represented in the digital representation. Additional example object features 160 can include information related to time, location, news events, weather conditions, temperature, pressure, biometric signatures, voice or audio signals, or other types of modality. Regardless of the type of object features 160 or how the object features 160 are generated, recognition platform 140 can use the object features 160 to determine the nature of the real-world objects 120A or 120B. In some embodiments, the recognition platform recognizes objects 120A and 120B by searching an object database based on the object features. Suitable techniques for recognizing objects are discussed in co-owned U.S. Pat. Nos. 7,016,532; 7,477,780; 7,680,324; 7,403,652; 7,565,008; 7,899,243; 7,881,529; 7,899,252; and others in the same family.

Recognition platform 140 can provide the object features 160 to authentication agent 180. Authentication agent 180 can use object features 160, or other object information, to determine if the real-world object 120A or 120B are indeed valid authentication objects by discriminating the objects from others in the scene as represented by digital representation 141. Object features 160 or additional information can be used to construct a query to search authentication object database 150 for objects that are considered valid authentication objects. Authentication agent 180 can use the query to obtain a result set of known authentication objects having object features that satisfy the query. Thus, the database look-up can be used to discriminate among objects represented in digital representation 141 to determine if they are valid authentication objects. In the example shown, the plant or the driver's license (or both) could be validated by authentication agent 180 as actual valid authentication objects with respect to one or more properties of interaction 105. For example, the plant and driver's license might only be valid for the specific user as determined from user account information, registered authentication objects, the user's specific electronic device as determined from a device identifier, at the current GPS coordinates or location data, or for a specified period of time. All these factors, and more, can be brought to bear to determine if real-world objects 120A or 120B are indeed valid authentication objects for activating content. As mentioned previously, virtual objects can also represent valid authentication objects through similar techniques.

Valid authentication objects can include a wide variety of objects. Example 2D objects can include printed media (e.g., a driver's license, a passport, a signature, a check, a document, a poster, a billboard, a photograph, a rendered image, a book, a news paper, a magazine, etc.), a shadow, a rendered image on a display screen (e.g., computer display, television, game system, electronic billboard, movie screen, kiosk, vending machine, medical display screen, etc.), a rendered virtual object, credit card, or other approximately planar objects. Example 3D objects that could be used as a valid authentication object can include a person, a face, an animal, an item of clothing, a vehicle, a building, a toy, a plant, a computing device, a construction, a food, a figurine, a printed model, a robot, a tool, or other physical objects having substantial width, depth, or lengths. Still further, valid authentication objects can also include temporal aspects. Example objects that change with time include spoken words, videos, music, gestures, articulated movement of devices (e.g., toys, robots, etc.), or other objects that change with time.

Once authentication agent 180 determines that two or more of physical object 120A or 120B correspond to valid authentication objects, authentication agent 180 can determine one or more content access levels 183 based on a juxtaposition of features 160, authentication features, or other information available. Access levels 183 determine an extent of content 193 to be activated for current interaction 105, extent of control over the content, or extent of possible future interactions with the content 193 in environment 100. Access levels 183 can be derived based on a look-up table or calculated based how well the features 160 match salient authentication features mapped to content access levels 183. For example, if the driver's license is in front of the plant, then a full complement of content 193 could be activated. If the driver's license in the back of the plant, then minimal content 193 might be activated. Such an approach allows content publishers to determine how or to what extent their content 193 can be distributed. Further, placement of object 120A relative to object 120B can control how content 193 is accessed. To continue the previous example, as the driver's license is moved further in front of the plant so that the driver's license subtends a greater portion of the image, the content 193 could be instructed to fast forward. If the driver's license is moved behind the plant, the content 193 could be instructed to rewind. In such cases, the derived distance in the interaction space between the object 120A and object 120B can be used to control a playback speed.

Content access levels 183, or information related to access levels 183, can be provided to content server 190 storing one or more portions of content 193 in content database 195. The access level information informs content server 190 which content 193 or the extent of content 193 to be presented to the user of electronic devices 110 or other output devices. Thus, the identified content 193 is activated for consumption by the user. The output device could include the electronic device 110, an appliance, a printer, a robot, a machine, a vehicle, or type of device capable of presenting the content.

In some embodiments, content server 190 can send a signal or instruction to the electronic device 110, or other output device, to instantiate virtual machine 112. In the example shown, virtual machine 112 is cuphuistically represented as a box external to the output device, (i.e., electronic device 110). However, one skilled in the art would appreciate that virtual machine 112 is instantiated within the memory or processor of electronic device 110. Virtual machine 112 can remain under control of content sever 190, authentication agent 180, or content provider, according to one or more rules determined by access levels 183. Content server 190 can then instruct virtual machine 112 to present content 193 on output electronic device 110. By ensuring that content server 190, or other elements of the infrastructure, controls virtual machine 112 or its functions, the content provider's rights remain protected while also allowing a content consumer to acquire content 193 on demand via recognizing valid authentication objects. Suitable techniques for instantiating virtual machine 112 and controlling presentation of content are described in U.S. Pat. No. 7,181,617 to Wise titled "Remote Virtual Medical Diagnostic Imaging Viewer" filed Jun. 10, 2002; U.S. Pat. No. 7,685,417 to Wise titled "Remote Data Viewer" filed Jan. 19, 2007; U.S. patent application publication 2008/0263048 to Wise titled "File Access Management System" filed Apr. 16, 2008; and U.S. patent application publication 2010/0169642 to Wise titled "Remote Data Viewer", filed Mar. 12, 2010.

The inventive subject matter is considered to include instantiating or launching virtual machine 112 with properties determined from authentication object features 160. Such features can dictate a consumer's access to the presented or rendered content 193. For example, the juxtaposition of the real-world objects relative to each other could cause virtual machine 112 to be instantiated in a manner enabling the content consumer to time-shift the content (e.g., fast forward, rewind, pause, etc.).

Figure 2:
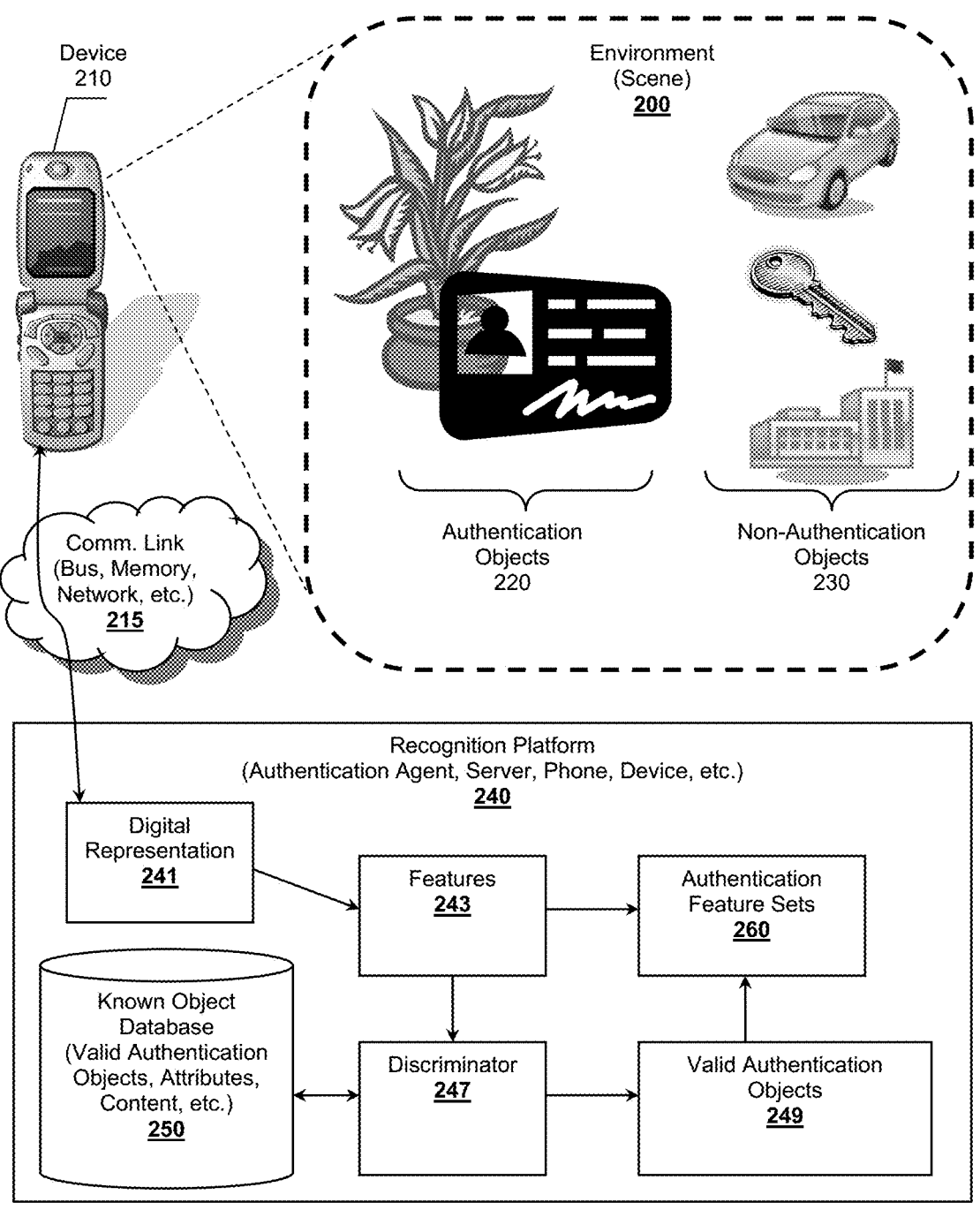
FIG. 2 is a schematic of a recognition platform discriminating authentication objects within an environment from other objects.

FIG. 2 provides a more detailed overview of discrimination between authentication objects 220 and non-authentication objects 230 within environment 200. An individual leverages device 210 to interact with environment 200, which can include multiple objects. The objects in the environment could include one or more authentication objects 220 or non-authentication objects 230. Device 210 obtains digital representation 241 comprising data, possibly multi-modal data, which represents aspects of environment 200. Device 210 transmits digital representation 241 over communication link 215 to recognition platform 240. Communication link 215 could include a network (e.g., wireless, wired, Internet, PAN, VPN, WAN, etc.) when recognition platform 240 is distal from device 210, or could include an internal connection (e.g., bus, shared memory, register, API, etc.) if recognition platform 240 is disposed within device 210. One should note recognition platform 240 can be coupled with an authentication agent, content server, device 210, remote services, or other computing platforms. For the sake of the current discussion, recognition platform 240 should be considered to include an authentication agent.

Recognition platform 240 applies one or more analysis techniques on digital representation 241 to generate features 243 from digital representation 241. In some embodiments, features 243 can be considered properties of digital representation 241 itself rather than features of environment 200. For example, image data can be analyzed to generated image features possibly including descriptors (e.g., color balance, histograms, wavelets, SIFT features, BRISK key points, SURF descriptors, ORB descriptors, etc.), moving descriptors derived from motion data (e.g., vSLAM, GPS, etc.), audio parameters (e.g., amplitude, phase, frequency, etc.), or other types of features 243. Such features can then be used by discriminator 247 to discriminate authentication objects 220 from non-authentication objects 230.

In some embodiments, discriminator 247 can operate as a search engine that receives the query and submits the query to known object database 250. In response to the query, known object database 250 returns a result set of authentication information related to authentication objects that have attributes satisfying the query. Know object database 250 can be configured to store authentication object information possibly indexed according to a common namespace to which features 243 adheres. The common namespace can be considered a schema defined in a manner that describes a possible interaction space. The interaction space can be considered a multi-dimensional space where each dimension represents a possible form or modality of sensor data. The interaction space can be defined in terms of location information (e.g., coordinates; X, Y, or Z; longitude, latitude; etc.), time information, orientation information, biometric information, or other interaction space information. Thus, the authentication object information can be stored or retrieved based on SIFT features or clusters of features, audio signatures, sensor signatures, location or position coordinates, orientation signatures, biometric signatures, user profile information, or other aspects within the interaction space.

Discriminator 247 receives the results set from known object database 250 and discriminates among objects within environment 200 by consulting the returned authentication object information. Discriminator 247 compares features 243, or other information available to the system or through digital representation 241, to authentication object information in the result set to identify any known objects. If known objects are found and are considered valid authentication objects 249 with respect to the interaction, then recognition platform 240 derives one or more sets of authentication features 260 with respect to each valid authentication object 249.

As a more concrete example, consider a scenario where device 210 captures an image of environment 200, which has multiple objects as depicted in FIG. 2. Digital representation 241 would likely comprise image data, among other modalities. However, for the sake of discussion, this example will focus on the image data. Recognition platform 240 could analyzes the image data and generate a number of SIFT or BRISK image descriptors relating to the image data. The descriptors can then be passed to discriminator 247, which in turn generates a query as a function of the image descriptors and submits the query to know object database 250. The query can include actual image descriptors along with other information. Known object database 250 can return a set of known object information related to a priori known imaged objects that are considered to have similar image descriptors, at least to within a confidence level, as required by the query. For example, known object database 250 could return information related to just authentication objects 220 or could return information related to additional objects beyond authentication objects 220; non-authentication objects 230 for example. One should appreciate that this approach can be used to recognize essentially any object in environment 200 if the objects are already known or registered with known object database 250. The approach is advantageous because is allows for utilizing existing or third party object databases rather than having a proprietary database. Example third party object databases including Google® Goggles™, in8™ Mobile's iD (see URL www.in8.com/#big-id), Amazon, or other third party object databases.

To continue the example, discriminator 247 consults the returned object information and discriminates, based on the image data, which of the objects are indeed valid authentication objects 290. For example, if all objects in environment 200 are represented in the results set, the information related to authentication objects 220 can be tagged with metadata or other type of data indicating that they are in fact valid authentication objects 249. One should appreciate that valid authentication objects 249 include authentication objects 220, a portion of authentication objects 220, or other objects beyond those in the image data; a person identified from a voice print for example.

Regardless of how objects are discriminated, continuing with the example, recognition platform 240 derives one or more of authentication feature sets 260 from features 243 and valid authentication objects 240. With respect to the image data and the example presented, authentication feature sets 260 could include a first authentication feature set that corresponds to the plant and a second authentication features set that corresponds to the driver's license (e.g., a document).

Figure 3:
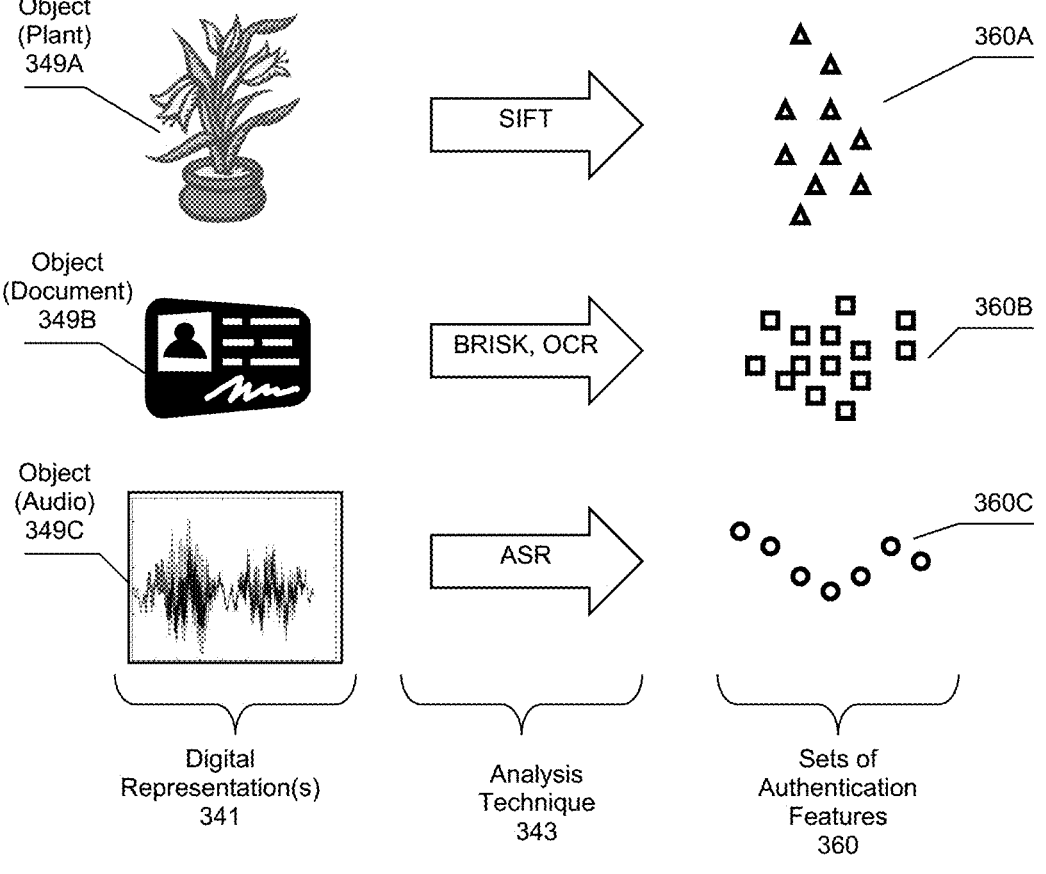
FIG. 3 is an illustration of analyzing digital representations of objects to derive sets of authentication features.

FIG. 3 illustrates a subset of possible analyses that could generate sets of authentication features 360. In the example, sets of authentication features 360 includes set 360A corresponding to the plant object 349A, set 360B corresponding to the document objects 349B, and set 360C corresponding to audio object 349C. Each of object 349A through 349C can be represented via one or more data modalities within digital representation 341. For example digital representation 341 could include image data (e.g., JPG, PNG, BMP, still image, video, etc.) that represents object 349A and 349B. Further, digital representation 341 could include audio data (e.g., WAV, MP3, recording, etc.) that represents sounds associated with the environment.

Each modality of data within digital representation 341 can be analyzed according to one or more analysis techniques 343 associated with the modality. Image data can be analyzed using techniques possibly including one or more of the following: SIFT, BRISK, SURF, SLAM, vSLAM, wavelets, optical character recognition (OCR), or other techniques to generate feature sets 360A or 360A. One should appreciate that feature sets 360A or 360B could include raw derived features (e.g., descriptors at a specific locations in the image data or in the interaction space) or indirect or inferred features. Indirect or inferred features could include text obtained from applying OCR to the image data, or metadata or tags based on an object look up. For example, feature set 360A might include a tag naming the type, genus, or species of plant object 349A even though such information is not present in textural form in the image data. Further, feature set 360C might only include words as reconstructed by automatic speech recognition (ASR) techniques and as recorded with respect to time. Each of sets of authentication features 360 is illustrated has having numerous features. One should appreciate that a set of authentication features 360 can include one, three, seven, ten, or more features depending on the techniques used to generate the features. For example, an image-based feature set could include more than a hundred or even more than a thousand features. Although sets of authentication features can include symbol data (e.g., text, alphanumeric, bar code, QR code, matrix code, color codes, etc.), it is contemplated that the set of features can lack information derived from a symbolic tag associated with the valid authentication objects. For example, the set of features can lack any bar code data associated with the valid authentication object while still being useful to activate content.

Sets of authentication features 360 are presented as distinct and separately managed objects within FIG. 3. Each of sets 360 could be used individually to identify or authenticate respective objects 349A through 349C. Further sets 360 could be combined to create a collective token or key to identify or authenticate a user or requested interaction. Still further as disclosed herein, the juxtaposition of the sets 360 with respect to each other in the interaction space gives rise to a rich authentication, authorization, command, control, or management system capable of activating content.

Figure 4:
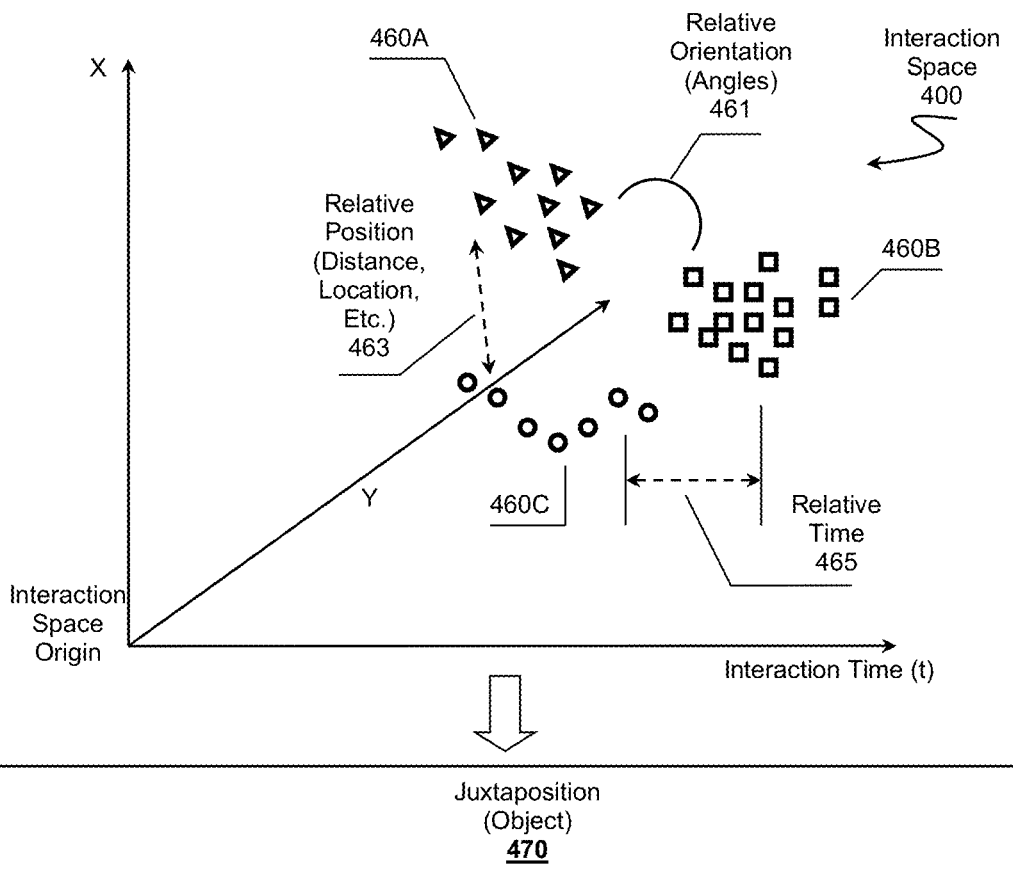
FIG. 4 is an illustration a juxtaposition of sets of authentication features in an interaction space.

FIG. 4 illustrates deriving a juxtaposition object 470 from multiple authentication feature sets 460A, 460B, and 460C, collectively referred to as authentication feature sets 460. As mentioned previously, authentication feature sets 460 exist in interaction space 400. Interaction space 400 is illustrated as a physical space (i.e., X, Y, axes) and having a time component (i.e., t axis) for the sake of discussion. One should appreciate that interaction space 460 could have other dimensions possibly including derived intent, context, demographic, or other aspect related to the interaction. Each point in the interaction space 400 could be represented by a vector or an N-Tuple.

Each of authentication feature sets 460 can be considered to exist within the interaction spaces. For example, set 460A could represent one or more SIFT features derived from an imaged plant object (see FIG. 3, set 360A) where each feature corresponds to a relative position in a physical space-time as shown. The position of the SIFT features could be determined through depth of field calculations possibly based on the techniques disclosed in U.S. patent application publication 2012/0163672 to Mckinnon titled "Depth Estimate Determination, Systems and Methods", filed Jun. 7, 2012. The position of the features could also be derived from use of vSLAM when motion data is available.

Still further, the position with respect to time can be determined based on time-stamps within the digital representation, time-stamps based on observations, or even when the data arrives. The interaction action space origin can be determined from location data of the capture device (e.g., GPS, inertial movement, etc.), from position or orientation of the capturing device relative to the background, or other location-based information. Thus, each feature set 460A, 460B, or 460C exist as points or locations within interaction space 400.

The clusters of features in feature sets 460 can treated as a group by identifying the clusters with respect to an authentication object. The clusters can be discovered or derived within the interaction space via one or more cluster techniques. For example, feature sets 460A could be found through using K-means (i.e., centroid-based clustering), EM clustering (i.e., distribution based clustering), DBSCAN (i.e., density based clustering), CLIQUE or SUBCLU (i.e., sub-space clustering in higher dimensional data), or other types of clustering techniques. Thus, each cluster can be identified as being associated with a valid authentication object. Further, the clusters can have extent over the space; center of "mass", centroid, center, number, widths, range, density, length, breadth, duration, or other property. Such properties can then be used to determine juxtaposition attributes and are considered advantageous when determining content access level.

The juxtaposition among feature sets 460 can be determined based on various aspects or properties of interaction space 400. In the example show, the juxtaposition can be determined based on relative orientation 461 of one of feature sets 460 relative to another. Once a preferred direction of a feature set is selected (i.e., determine which elements of a set is consider a preferred "top" or "up" of the set), the orientation could be represented based on absolute angels relative to the interaction space origin, or could be represented based on relative angles from one set to another. Orientation 461 could be represented by a set of Euler Angles with respect to interaction space 400. Further, the juxtaposition can be determined based on relative position 463 among feature sets 460. Relative position 463 could be represented as a vector having a elements corresponding to each dimension of interaction space where the value of each element represents a distance or different in distance. In a three dimensional space, relative position 463 between feature set 460A and 460C could be represented as $V=\{X_C-X_A, Y_C-Y_A, Z_C-Z_A\}$. Relative position could also be represented based on absolute coordinates relative to the interaction space origin. Still further, the juxtaposition among feature sets 460 could be based on relative time 465. Relative time 465 can be expressed based on when each of feature sets 460 occurred or when detected with respect to the interaction. One should appreciate that other dimensions of interaction space 400 can be also be used to calculate or derive a juxtaposition among feature sets 460.

Juxtaposition 470 represents an aggregation of juxtaposition information 470A, 470B, and 470C, derived from feature sets 460A, 460B, and 460C respectively. The juxtaposition information can be considered a set of juxtaposition attributes that relate to the current interaction of interest. The attributes can include names of identified objects, number of relvant features in a feature set, types of objects or features, a centroid of the feature set, relative values or positions, or other juxtaposition attributes.

Figure 5:
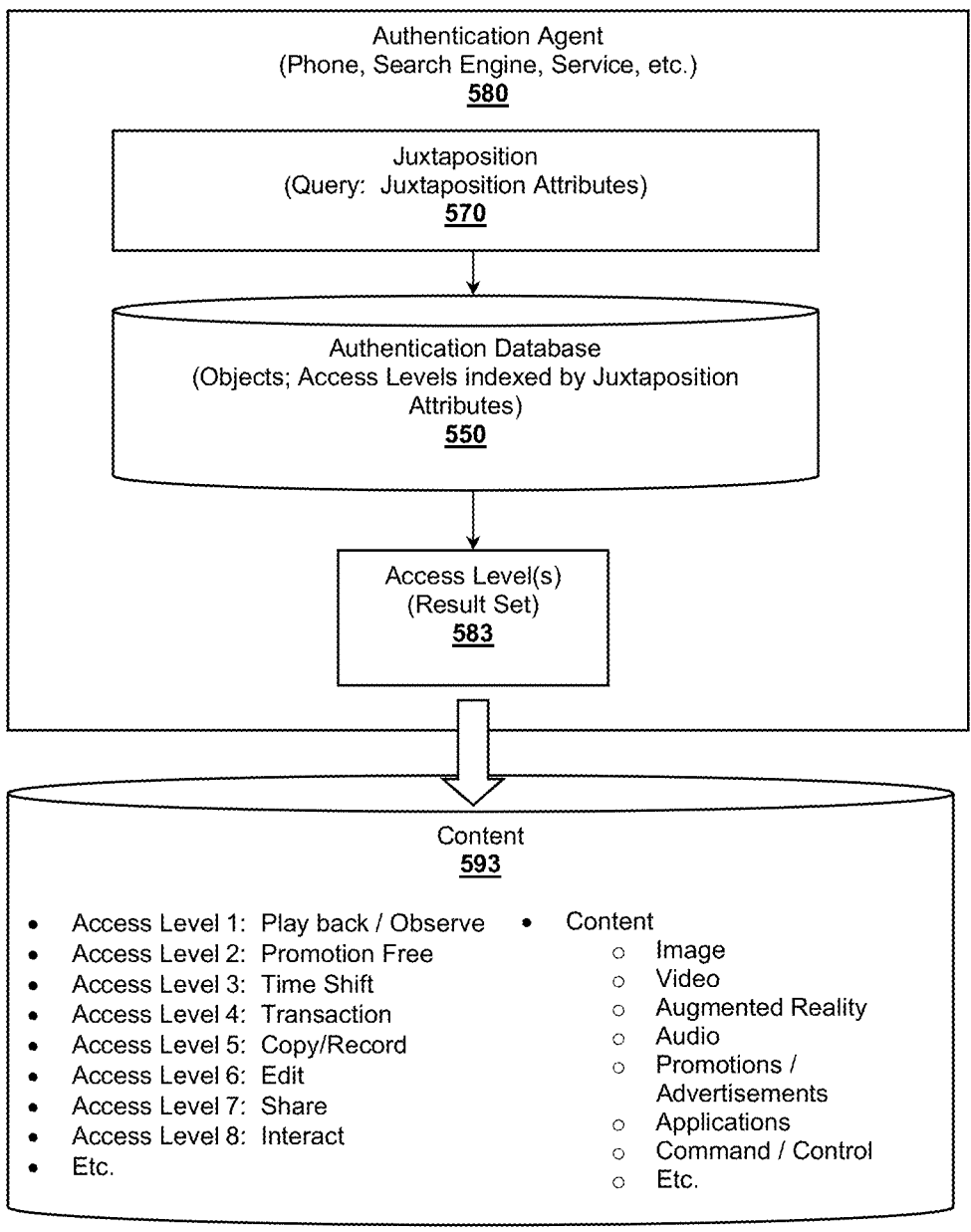
FIG. 5 is an illustration of determining content access levels based on a juxtaposition of sets of authentication figures.

FIG. 5 illustrates a possible method of establishing, by authentication agent 580, one or more access levels 583 for content 593. In the example shown, authentication agent 580 utilizes one or more juxtaposition 570 as a foundation for
generating a query or other criteria used to select an access
level. For example, the query could comprise object iden-
tifiers (e.g., name, brand, type, GUIDs, UUIDs, serial num-
bers, etc) or other object attributes along with juxtaposition
attributes relating to corresponding authentication feature
sets (e.g., position, clusters, groups, orientations, time, etc.).
Authentication agent 580 can submit the query to authenti-
cation database 550, which in turn returns content informa-
tion that is unlocked by juxtaposition 570. The content
information can include access levels 583, which can be
used to access one or more of content 593.

Access levels 583 represent a degree or extent to which a
user can interact with content 593. As illustrated content 593
could comprise multiple access levels, depending on the
nature of the content, where each level can be activated
based on juxtaposition 570. For example, if content 593
comprises an augmented reality promotional game acces-
sible via cell phone, the level of access to the game can be
determined by different juxtapositions of valid authentica-
tion objects, a say a beverage can and an NBA poster of the
Lakers®. As the user positions with beverage can around the
poster or relative to features of the poster (e.g., pictures of
players, logos, etc.), the user can gain greater access. Per-
haps, placing a Pepsi® can to the right of Kobe Bryant
would correspond to access level 1, which merely enables
the user to observe or playback game content. If the user
places a Coke® to the right of Kobe Bryant, perhaps the user
would achieve access level 2 and receive a free coupon or
promotion. Still, further moving the can into relative posi-
tions could offer greater control by authorizing the user to
time shift content, initiate or participate in a transaction,
copy or record content, edit content, share the content,
interact directly or indirectly with the content, or otherwise
access the content. Thus the output device can present a
promotion associated with a product as content 593, espe-
cially when the promotion is associated with the valid
authentication object. Although the example uses a beverage
can as an example, the promotion could include a coupon, a
commercial, an offer, a sale, a lottery ticket, an advertise-
ment, or other type of promotion.

One should appreciate that access levels 583 could rep-
resent security measures in addition to control measures. A
user can position two objects relative to each other and
register the configuration with the system as a token for
unlocking a bank account or authorizing a transaction. The
user could also register a second arrangement that might be
similar to the first arrangement, but would activate the
content according to a different access level 583. For
example, placing a driver's license to the right of a plant
might activate a transaction with a person's bank account.
However, should an individual fall under duress, it would be
beneficial to simulate activation of the transaction. Perhaps
placing the driver's license to the left of the plant might
activate a fake transaction while also notifying authorities of
malicious activities.

Content 593 can include a broad spectrum to modalities or
types of content. Example types of content can include
applications software or modules, image data, video data,
audio data, medical records, game data, promotion data,
goods or services information, virtual or augmented reality
data, commands, instructions, robotic instructions or com-
mands, or other types of data. Further examples of content
include transaction information, entertainment information,
news information, sports information, promotional informa-
tion, medical information, security information, gaming
information, application information, healthcare information, office or worker information, or other types of infor-
mation. Example modalities can include auditory, visual,
kinesthetic, gestures, olfactory, tactile, taste, sensor infor-
mation, or other types of modalities. Still, further the content
can include multiple types of media and can be consider
trans-media content FIG. 6 presents method 600 for activating content based
on the disclosed techniques. Step 610 includes enabling an
electronic device to access an authentication agent. In some
embodiments, a user can install software instructions on a
non-transitory computer readable memory of the electronic
device where the instructions execute on a processor to
provide the services of the authentication agent. The authen-
tication agent can function as stand alone application, as
modules within a library, or even as an integral part of an
operating system. In other embodiments, the authentication
agent can be accessed over a network where one or more
remote computing devices provide access to the authentica-
tion agent services. For example, an authentication agent can
function as a for-fee service operating as a virtualized
cloud-base system (e.g., PaaS, IaaS, SaaS, etc.). Example
electronic devices can include smart phones, vehicles, appli-
ances, kiosks, game systems, vending machines, medical
device, ATMs, or other types of electronic devices.

Step 620 includes the electronic device obtaining a digital
representation of an interaction with an environment, physi-
cal or virtual, that includes a plurality of objects. The
electronic device can obtain the digital representation from
one or more sensors. The sensors can be internal or inte-
grated with the electronic device or could be remote to the
device. For example, in an embodiment where the electronic
device comprises a smart phone, sensors can include an
integrated camera, accelerometer, a touch display, micro-
phone, GPS sensor, wireless transceiver, or other sensors.
Remote sensors can include security cameras, weather sen-
sors, medical sensors, Hall Effect probes, or other sensing
devices that can be accessed via a communication link
external to the electronic device. The interaction can include
recording audio, purchasing a product, capturing an image,
sharing content in a social network, operating the electronic
device, playing a game, gardening, or other type of inter-
action that can be sensed.

The digital representation is considered to comprise data
representative of the environment as obtained from the
varied sensors. In view that the sensors can capture a wide
variety of data modalities, the method can further include
obtaining a multi-modal data as a portion of the digital
representation. For example, the multi-modal data can
include two or more of image data, motion data, audio data,
temperature data, location data, position data, orientation
data, metadata, chemical data, medical data, user data,
kinesthetic data, bio-metric data, language data, acceleration
data, heading data, or other types of data as suggested by
step 625.

Step 630 can include discriminating at least two different
objects from the plurality of objects in the environment as
valid authentication objects based on the digital representa-
tion. In some embodiments a recognition platform analyzes
the digital representation to convert the digital signals into
one or more attributes or properties, which can then be used
to identify or recognize disparate objects possibly via a
database look-up. The recognition platform can recognize
multiple objects within the environment by matching known
objects to the derived attributes. The recognized objects can
then be discriminated as being valid authentication objects
versus non-authentication objects by consulting object infor-
mation in stored in the known object database or in an authentication object registry. When a match is found and the match is registered as a valid authentication object, the recognition platform can notify the authentication agent that at least some of the objects in the environment having matches are indeed valid authentication objects. One should appreciate that the recognition platform could be disposed within electronic device or could also be disposed in remote servers, possibly coupled with the authentication agent over a network.

Step 640 includes deriving at least a first set of authentication features from the digital presentation and associated with the first valid authentication object, and deriving a second, different set of authentication features from the digital presentation and associated with the second valid authentication object. The sets of authentication features can include the derived attributes or properties of the digital representation, or can include indirect or inferred features. Derived attributes can include features such as image descriptors or key points, audio signal properties, biometric signal strengths, or other such features. The indirect or inferred features can be obtained via obtaining object information related to the recognized objects; a name, a class, a brand, an identity, metadata, or other property. Further, as suggested by step 641, deriving the sets of authentication features can include deriving at least two features sets of different modalities; image data and audio data for example. Further, at step 643 deriving the feature sets can include deriving image features from image data (e.g., SIFT feature, image characteristics, a depth of field, etc.), related to the valid authentication object in the digital representation. Still further, step 645 can include calculating a hash as an authentication feature from the digital representation associated with the valid authentication objects.

One should appreciate that the sets of authentication features do not necessarily represent all possible features associated with a valid authentication object. Rather, the authentication features could simply represent the features associated with a portion of the object; front, side, back, or other portion. For example, the set of authentication features could comprise image data of just a portion of the authentication object. Thus, a single authentication object's position, orientation, facing, or covering can influence activation of content. The authentication features could include one, two, three, seven, or more types of feature data. Example feature data could be based on image data, motion data, audio data, temperature data, location data, position data, orientation data, metadata, user data, kinesthetic data, biometric data, language data, acceleration data, heading data, or other types of data.

Step 650 includes deriving a juxtaposition among the authentication feature sets associated with each valid authentication object. The juxtaposition can be considered a constructed or instantiated object that includes juxtaposition attributes describing the position, arrangement, relative placement, or other configuration of features sets within an interaction space. In a three dimensional physical space and where the sets of authentication features include image data features (e.g., SIFT features, BRISK key points, vSLAM coordinates, etc), the feature sets could comprises clusters of image features having extent or positions within the 3D space. Thus, the juxtaposition can include information relating to how multiple feature sets are arranged in the 3D space relative to each other. The juxtaposition attributes can be defined in terms of individual features, clusters of features, or sub-sets of features. For example, if the authentication features comprise multiple image feature clusters, the juxtaposition could be described as a geometric distance in the 3D space between the centroid of the first cluster and the centroid of the second cluster. One should appreciate that the interaction space can be a multi-dimensional space defined by more dimensions than physical dimensions. Example additional dimensions can include time, user demographics, derived emotional or intent, social relationships, or other dimensions.

In view that the juxtaposition can be described with respect to arrangement of the sets of authentication features within an interaction space, one should appreciate that the juxtaposition can include attributes derived based on relative placement in the interaction space. Therefore, step 651 can include determining the juxtaposition of the sets of authentication features based on relative position information derived from relative position of the corresponding valid authentication objects within the digital representation. The relative position information could also be determined directly from the sets of authentication features. The relative position can be a physical length (e.g., inches, feet, miles, centimeters, meters, kilometers, etc.), a relative difference between scales (e.g., an emotional scale), or other relative measure within the interaction space. In a similar vein, step 653 can include determining the juxtaposition of the sets of authentication features based on relative orientation information of the corresponding valid authentication objects in the digital representations, or directly from the relative orientation of the sets of authentication features within the interaction space. The relative orientation information can include angles with respect to a reference point (e.g., camera, user, geo-location, etc.), or could include simple orientations expressed in terms of a facing of the feature sets (e.g., up, down, left, right, facing, etc.) relative to each other. Still further, step 655 can include determining the juxtaposition based on relative time information with respect to the sets of authentication features. The relative time can express when a first set of features appears or changes relative to a temporal existence of a second set of features. The relative time information can also comprises motion information (e.g., apparent path, velocity, acceleration, jerk, etc.), time of appearance, time of disappearance, time of change (e.g., rotation, change in facing, migration of feature sets, etc.), migration or change of features in a cluster, or other time related information.

One should appreciate that sets of authentication features, or content triggering criteria, can depend on geo-location data. The geo-location data can reflect a location of the interaction within a building or even outside of the building. For example, the location data can be obtained via GPS, or even non-GPS techniques. Example non-GPS techniques include using visual-based mapping (e.g., SLAM, vSLAM) relative to visual features present in the environment. Another example of non-GPS techniques include using Iridium satellite signals (e.g., 1626.104 MHz, 20.32 mS QPSK bursts, etc.) which are capable of penetrating buildings. Such non-GPS geo-location information can be folded into the juxtaposition attributes for user authentication or activation of content.

Step 660 can include establishing, possibly by the authentication agent, a content access level as a function of the juxtaposition of the sets of authentication features with respect to each other. The content access level can be determined by comparing the juxtaposition attributes to attributes bound to a policy or rules set governing how content should be accessed. For example, once content is identified as being relevant, the content can have an associated access policy where the policy indicates access level criteria defined in terms of juxtaposition attributes. The policy can be bound directly to the content, or separate from the content. As an example (see FIG. 5), the authentication agent can couple with an access level database and use the juxtaposition attributes to create a query targeting the database. In response to the query, the database can return access levels or policy having criteria that satisfy the query.

Step 670 can include activating the content possibly via the authentication agent based on the content access levels. Activation can occur through different techniques. In some embodiments, the content or portions of the content can be a priori present on the target output device (e.g., the electronic device) and the device can be instructed to grant access to the content based on the content access levels. In other embodiments, the content can be activated by initiating an additional action by providing commands or instructions to the target output device. The additional action could include instructing a device to initiate downloading the content, conducting a financial transaction to purchase the content, launching a content player, launching a virtual machine, or other actions.

Activating the content can include activating the content as a function of activation triggering criteria as suggested by step 675. The triggering criteria can be used to dictate which content is, in fact, available based on the interaction space. For example, specific content might only be available within a defined geo-fence or at a defined time period. Thus, the content can be 1) made available based on the triggering criteria, and 2) controlled based on access levels. The triggering criteria can be defined based on attributes or dimensions of the interaction space. Thus the activation triggering criteria can depend on absolute or relative times, a number of authentication requests or other authentication metrics, the nature of the authentication features (e.g., image versus sound), factors other than the authentication features (e.g., context, geo-fences, etc), factors exclusive of authentication features (i.e., does not depend on authentication features), or other factors.

Step 680 includes configuring an output device, possibly by the authentication agent, to present the content according to the content access levels. As alluded to above, the output device can be configured through sending one or more commands to the output device to take action. The commands that configure the device, or it associated content players, depend on the nature of the content. For example, when the content comprises a media file (e.g., video, music, etc.), the commands could restrict or enable the corresponding player on the output device from time shifting the content based on the granted access levels. However, if the content comprises a 3D printer file, the commands could restrict or enable the printer to create a 3D object from the file in color.

In some embodiments, configuring the output device can include instructing the output device to launch a virtual machine as suggested by step 681. The virtual machine could include a Java® virtual machine, a .NET® virtual machine, a Python virtual machine, a VMWare® virtual machine, or other virtual machine. Use of a virtual machine is considered advantageous because the content can be isolated from the user based on access level. For example, the virtual machine can be launched and the content can be stored within a secured memory (e.g., encrypted memory, secured container, FIPS-140, etc.). The method can further include step 683, securing the virtual machine with respect to content rights according to the access levels. The controller (e.g., the content provider) of the virtual machine can then allow the user to observe the content while ensuring the controller restricts access. A content player, or content within the virtual machine can be secured by locking the content or player by a security token, by encrypting the content, or by applying other security measures. Further, step 685 can include the virtual machine restricting access to the content according to the access levels. As mentioned previously, the virtual machine can be commanded to lock down a content player's or output device's features with respect to presenting the content.

Examples

The following sections describe various embodiments of the inventive subject matter.

Content Activation Based on Authentication Objects

One aspect of the inventive subject matter includes content activation based on authentication objects, including methods of activating content. The methods can include a step of providing access to an authentication agent configured to authenticate a user, device, or other entity with respect to desirable content. Access can be provided via an electronic device interface, possibly by an Internet connection to a cell phone. In some embodiments, the authentication agent, possibly along with other elements in the ecosystem, can be offered as a for-fee service to content providers or to consumers.

The method can include the step of obtaining a multi-modal digital representation of an interaction with at least one physical object. The multi-modal digital representation can include various types of data as discussed previously and can reflect an entity's interaction with a scene or the physical object. One should appreciate that digital representation comprises data from the electronic device or other data sources. Interactions can include taking an image of the physical object, being near the physical object, physically interacting with the object, monitoring the physical object, or other types of interactions, direct or indirect. Example modalities in a multi-modal digital representation can include one, two, or more of the following types of data: image data, motion data, audio data, temperature data, location data, position data, orientation data, metadata, user data, kinesthetic data, bio-metric data, language data, acceleration data, velocity data, heading data, changes in a baseline data, or other types of data.

As discussed previously, the physical object can include just about any type of object because the algorithms used to analyze the digital representation can be agnostic to the object itself. Rather, the algorithms seek features found in the associated data (e.g., SIFT features, audio features, sensor data signatures, etc.). The physical object can include different types of objects including printed media, substantially three dimensional objects, or even computing devices presenting rendered images. Example printed media could include a driver's license, a signature, a poster, a billboard, a photograph, a rendered image, a book, a news paper, or a magazine. Example three dimensional objects that can be used as a foundation for authentication include a person, a face, an animal, a vehicle, a building, a toy, a plant, a computing device, a construction, a figurine, or other objects. Example rendered images could include a computer screen, a kiosk, an electronic bulleting board, a television, a movie screen, a gaming system, or other types of rendered images.

Authentication features can also comprise different modalities based on the modalities of the digital representation. Each type of modality can be treated separately or together to create a more sophisticated or complex authentication scheme. In more preferred embodiments, authentication features include at least two different modalities, image data and audio data for example. An especially contemplated authentication feature includes image data associated with an authentication object or at least a portion of the authentication object. In some embodiments, the authentication feature can include a hash value, possibly perception hash, of the image.

The method further includes recognizing the physical object from other objects associated with the interaction where the physical object is identified as a valid authentication object. The physical object can be identified based on information derived from the multi-modal digital representation including object features. The physical object can be recognized by searching an authentication object database having authentication objects with similar object features to those derived from the digital representation.

The method can further include deriving a plurality of authentication features related to the authentication object where the authentication features can be consider quantified values or parameters for conducting authentication. For example, the authentication features can be consider keys, possibly including SIFT features, audio features, hash values, image or image data characteristics, depth of field information from the image or audio, or other types of data that can be derived from the digital representation or information associated with the authentication object.

One should appreciate that the interaction with the physical object and the resulting digital representation can comprise interactions with multiple authentication objects as illustrated in FIG. 1. In scenarios where multiple objects in a scene are considered authentication objects, the authentication features can be derived from the juxtaposition or arrangement of the objects relative to each other. The authentication features could include relative position information associated with the arrangement of the physical objects, or could include relative orientation information associated with the physical objects. For example, if the authentication objects include a driver's license and a coffee mug, the orientation of the mug handle relative to the driver's license might indicate a desired access level. If the handle points away from the license, perhaps minimal content might be activated. If the handle points toward to the license perhaps full content might be activated.

Authentication can require satisfactory presence, or even absence, of one or more authentication features before content can be activated. In some scenarios the authentication agent can require at least three authentication features, or even up to seven or more authentication features. Consider a healthcare scenario where a patient has entered an emergency room. A doctor can take an image of the patient (i.e., a real-world 3D object), states the patient's name, and states the doctor's name into a tablet computer. A recognition platform analyzes the image and audio data (e.g., digital representation of a multi-modal interaction) to derive features associated with the patient and voice. Further, the digital representation of the tablet can include a GPS location, a time, or other information. The derived features are then used to identify one or more authentication objects, in this scenario an authenticating object can include the patient's face. In response, an authentication agent derives a set of authentication features from the digital representation as well as information from the authentication object information. The authentication features could include (a) SIFT features of the patient's face, (b) voice pattern of the doctor, (c) the patient's name, (d) the doctor's name, (e) the GPS coordinates of the emergency room, (f) a time, (g) depth of field of the person's face, or (h) possibly an image of the patient's driver's license or healthcare card. Thus, a large group of authentication features can be used to determine a content access level. In this example, the content access level might allow the doctor to access all the patient's electronic medical records due to an emergency situation.

Based on the authentication features, the method can also include establishing a content access level. The content access level indicates which content, what content, or to what extent content is made available to a content consumer. The content can cover a broad spectrum of media types or information including transaction information, entertainment information, news information, sports information, promotional information, medical information, security information, gaming information, applications or software instructions, instructional information, or other types of data.

As especially preferred type of content includes promotional information related to goods, services, or other types of products. For example, the physical object could be a product that can be purchased in a grocery store. The product itself could be an authentication object, and the promotion information could include a coupon to be applied toward purchasing the product, a commercial, an advertisement, or other type of promotional information.

The method also includes activating the content according the access level. Activation can occur on the authentication agent or can include providing the access levels to a content server, which in turn activates the content. In some embodiments, additional activation triggering criteria must be satisfied before activation can occur. For example, the activating triggering criteria could require a number of authentication requests coming into the system or an absolute time. Perhaps an episode of an interactive story is activated only when 100 users capture an image of a movie poster. Other examples of triggering criteria include factors other than the authentication criteria, or even exclusive of the authentication criteria. For example, the authentication criteria could depend on a specific time of day or a news alert.

Contemplated methods further include configuring an electronic device, a cell phone or tablet computer for example, to present the content according to the access levels. As discussed previously, configuring an electronic device to present or render the content can include instructing the electronic device to launch a virtual machine, preferably a secured virtual machine, under the control of the content server or a content provider. The virtual machine can restrict access to the content based on the access levels. Example electronic devices that can benefit from such content include a cell phone, a tablet computer, a computer, a vehicle, a kiosk, a vending machine, a robot, an electronic appliance, a medical device, a security system, a game console, or other types of device.

The algorithms used for analyzing the digital representation of the multi-modal interaction seek features associated with the objects partaking in the interactions or features in the data. Such features do not necessarily include or require decoding of symbols in an image. Thus, the authentication features can lack information derived from symbolic tags, a bar code for example, associated in the object in the interaction. Still, use of decoded symbol information (e.g., characters, numbers, bar codes, etc.) can augment the process.

Authentication Based on Recognizing an Object as an Authentication Object

Another aspect of the inventive subject matter is considered to include content distribution systems where content is activated based on recognizing that an actual object is, in fact, an authentication object. Distribution systems can include an authentication object database, a recognition platform, and an authentication agent as illustrated in FIG. 1. The following discussion elaborates on the ecosystem of FIG. 1.

The authentication object database stores authentication elements where the elements are bound to specific users and also have a set of valid authentication features relating to the object. The valid authentication features can represent required features and associated values or conditional features. Further, the authentication elements can include pointers or references to the content that the authentication features would unlock when the presence or absence of the features in an interaction have proper properties. In some embodiments, the authentication object database can comprise an image database or image search engine storing thousands, millions, or more images representing authentication objects. Example image databases that could be suitably adapted for use with the inventive subject matter includes Google® images, TinEye Reverse Image Search Engine™ (see URL www.tineye.com), medical image databases, or other types of image databases. In some embodiments, the images are indexed by relevant image authentication features (e.g., SIFT, depth of field, image data characteristics, metadata, etc.).

The recognition platform can be configured to specifically process image data associated with the digital representation along with other types of modalities. Once the recognition platform obtains the image data, it can derive object features relating to the objects in the image. Preferably, the recognition platform uses the object features to distinguish or recognize objects in the image from other objects where the recognized objects are considered authentication objects. The recognition platform can submit the object features to the authentication object database to compare the object features to the one or more of the valid authentication features to determine if the imaged objects are in deed authentication objects. More than one authentication element might be returned. In such a scenario the result set can be ranked according the how well the object features satisfied each element's set of valid authentication features.

The authentication agent uses the object features, including the image features, and the valid authentication features to determine a content access level as discussed previously. The authentication agent can determine the content access level based on pointers or references in the corresponding authentication elements or based on a request made the user. In some embodiments, a user could request specific content where content objects in a content database point to required authentication elements. While in other embodiments, the authentication elements point to content that can be activated by the authentication element. Once the content access levels have been established by the authentication agent, the authentication agent can authorize a content server to activate the content for the user.

Product Information from Captured Video Stream

Yet another aspect of the inventive subject matter includes methods of obtaining product information. The methods represent a specific embodiment where content consumers can activate product information based on capturing an image of a video frame in a video stream. The methods include providing access to a recognition server or other type of recognition platform. The recognition server can function as a service, a search engine for example, where consumers can submit one or more images to the service over a network connection.

The recognition sever obtains a captured video frame from a displayed video stream where the video frame is transmitted from an electronic device (e.g., cell phone, vehicle, camera, tablet computer, etc.). One should appreciate that the term "captured video frame" is used euphemistically to mean at least a still image of the video stream. The captured video frame could be one or more actual frames of the video stream, possibly captured during playback on the electronic device. Additionally, the captured video frame can include a still image taken by a camera sensor on an electronic device, or could include a still image where two or more actual video frames are shifting from one to anther, which might result in a somewhat blurry image. The recognition server can obtain the captured video frame from an electronic over a network connection. Example electronic device that could be used to capture the captured video frame include a cell phone, a game system, a computer, a tablet computer, a kiosk, an electronic billboard, or there type of device that is configured with a camera.

Regardless of the nature of the captured video frame, the recognition server derives one or more frame features from the captured video frame. The frame features can include SIFT features, perceptual hash values, histograms, recognized objects, or other features that can be derived from the captured video frame as discussed previously.

The recognition server can use the frame features to identify a known video stream having similar features. For example, the recognition server can submit the frame features as a query to a known video stream database. In response the video stream database returns a result set having one or more known video streams that have been a priori analyzed, possibly frame by frame. The videos in the result set can be ranked according to one or more of the derived frame features. Further, the result set can include additional information about the original video streams including associated product information. For example, an individual could submit a screen shot of a television show and submit it to the recognition server. The recognition server can identify the original television show and return a listing of products featured in the show or featured in advertisements during presentation of the show.

Contemplated methods further include configuring an electronic device to present the product information to the consumer. The product information, or other types of information for that matter, can include a name, a brand, a model number, a purchase price, instructions that configure the device to engage in a transaction, or other types of information.

In some embodiments, video streams can also comprise audio data that can be captured along with the captured video frame. When the captured video frame is captured, the audio data associated with the frame can also be captured. The recognition server can also derived audio features, which can also be used to identify video streams, or even positions in the video stream.

In especially preferred embodiments, the audio data can comprises data representative of sounds beyond human hearing; an ultrasound signature for example. Thus, a video stream can include additional audio information that can be used to identify the originating stream, products, broadcast, source, or other object. In such embodiment, the recognition server can analyze the audio stream to derive frequency components that can be used to recognize the stream or product associated with the stream.

Use Cases

The following discussion presents specific use-case scenarios intended to bring additional clarity to the inventive subject matter to specific markets. One should appreciate that each use-case scenario is also consider to be inventive subject matter.

One use-case includes providing product information based televised programs. When the consumer sees an interesting product, or other object on a televised program, the consumer can capture a screen shot using their cell phone. Further, the program can comprise one or more embedded high frequency signals, sounds greater that 20 KHz, which can carry additional information identifying aspects of the program or products in the program. For example, the cell phone can capture the high frequency audio signals and decode the signals to derive the embedded information. One should appreciate that the cell phone can operate as the recognition platform as desired. Therefore, the cell phone can send the raw data or derived features from the image or audio to an authentication service, which activates product information associated with the video screen. For example, a music video could feature various fashions. The cell phone user can purchase the fashions by requesting product information associated with the video.

Another use-case can include activating content associated with a periodical or poster. Consider a scenario where a consumer receives a magazine having one or more photographs of a sporting event. The consumer uses their cell phone to capture an image of the photograph. The image of the photograph can be authenticated against an image database, perhaps based on images available from Gettyimages® (see URL www.gettyimages.com). The image is analyzed and compared to known images. If a match is found, then an actual video feed, live or recorded, of the actual sporting event can be sent to the consumer's cell phone.

A similar use-case includes activating content based on images for a poster or billboard. Consider a billboard or poster promotion advertising an unknown up coming event. The goal is to develop a ground swell or viral interest in the mysterious event, perhaps a movie release or a release of a new type of smart phone. Perhaps the promotion simply states a day and a time, and then says the content will be activated if 10,000 people request activation at the same time based on a captured image of the promotion. When the day and time comes, and 10,000 requests come in, the content is activated. One should appreciate that the images of the promotion comprises activation features while the 10,000 request represent activation triggering criteria.

Still further a poster could represent a trans-media broadcast channel. An image of the poster can activate current content being broadcast to all viewers of the poster. The content can also be synchronized so that all consumers view or receive the same content substantially at the same time. For example, a poster of Kobe Bryant can provide updated content on a daily basis, or even throughout the day. As the consumer activates the content by capturing an image of the poster, the consumer would receive the content that is currently being delivered similar to a radio station or a television channel. The content could include programming based on sports highlights, news, blog postings, video segments, commentary, an actual game, or other types of content.

Yet another use-case includes providing coupons to consumers while shopping. As the consumer walks through the store, the consumer can capture images of target products, possibly in an attempt to do a price comparison. However, the store might not wish to loose the consumer. In response, the store operating as a content service could detect the price comparison event based on location information, image features, or other factors. The price comparison event could be detected by a remote search engine that notifies the store, or could be detected within the store if the consumer's cell phone utilizes the store's Wi-Fi access point. Regardless of how the event is detected, the store can activate coupons associated with the product in an attempt to retain the consumer. Thus, the retailer is able to provide coupons as a form of activated content without having to modify inventory or tag existing products on the shelf with bar codes.

Still another use-case can include computer-based gaming. The disclosed infrastructure allows for creating an on-demand content layer over the real world where the content can be activated based one or more interactions of players with the real-world. For example, content could be activated based on the interactions of multiple game players rather than a single player's interactions. Such a scenario gives rise to a game capable of supporting "magic", "spells", or alternative physics. Perhaps in an augmented reality game based on a fantasy setting, team players might all have to be in a specific location and interact with the objects at that the location. In some cases the players might have to act in unison to simulate a ritual, or act separately to simulate supporting each other in battle. If the players achieve capturing one or more digital representations of their interactions where the digital represents have the proper authentication features or triggering criteria, the players would activate new content. The capabilities offered by Fourth Wall Studios™ (see URL fourthwallstudios.com) could be suitably adapted for use in such a game playing scenario.

There are also use-cases associated with healthcare. One example includes using genomic information to activate content. For example, an individual's (e.g., human, pet, animal, plant, etc.) genome can be analyzed to determine features of the person genome. Example techniques for deriving the genomic features include those developed by Five3 Genomics™. The genomic features can then be linked to a generated signature or a heat map image of the genome. The signature or heat map can be considered a barcode or QR code representative of the genome. Further the features of the signature become the authentication features of the genome. The signature can then be a public facing authentication object that can be used to activate content. Security for the content can be further enhanced by requiring additional modalities beyond capturing an image of the signature, possibly including location data, position data, 3D object data, voice data, or other factors.

Another healthcare application could include activating content based on emergencies as discussed previously. Perhaps a doctor in an emergency room images a person to activate their medial records, or images a person's genomic signature or heat map on the back of their driver's license or healthcare card. Upon proper authentication, the patient's medical records become activated for the doctor.

Still yet another use-case can include a pet identification system. Pet owners can register their pets within an on-line service offering the capabilities discussed within this document. The owner can submit one or more photographs of their pet as authentication objects. The system can derive authentication features from the photographs, or offer the pet owner an option to select desired authentication features. The pet owner can place a picture of their pet on the pet's collar for easy identification. When the pet becomes lost, a person that finds the pet can take an image of the pet or of the picture on the collar. The features derived from the image can then be used to activate content. In this specific case, the activated content could include the owner's contact information, which can be presented to the finder of the pet.

Additional content could include owner identification, perhaps a video or image of the owner with the pet, can be sent to the finder. Further, the system can activate content on the owner' cell phone indicating where the pet finder is located or even directions on how to find the pet.

ADDITIONAL CONSIDERATIONS

The following additional considerations are presented to further illustrate the varied nature of the inventive subject matter.

One should appreciate that the subject matter is presented in terms of an authentication and content activation ecosystem. Each element of the ecosystem is presented as a distinct functional element in the system and in communication with each other. However, the elements of the system can be integrated in a single device (e.g., a cell phone) or distributed across multiple devices (e.g., a cell phone, television, and cloud computing system) as desired. It is specifically contemplated that electronic devices can comprise the recognition platform, or aspects of the recognition platform.

Activated content can be accessed in different fashions. In some embodiments, the content can simply be delivered to the electronic device once the proper authentication has been achieved and the content access levels are determined. The content can be pushed from a content server or pulled from the device. Thus, each individual receiving the content receives the content individually based on their own interactions and at different times. In other embodiments, content can be distributed among multiple individuals in a synchronized fashion where the individuals receive the same content at substantially the same time. For example, referring back to the poster of Kobe Bryant example, each individual could receive broadcast content at the same time. Yet other circumstances might include delivering the synchronized activated content to only a select few that have successfully satisfied activation triggering criteria and have found relevant activation features.

Another consideration relates to the number of consumers viewing activated content at the same time. If many thousands, if not millions or even billions, of people activate content at the same time, the infrastructure must support delivery of the content to massive numbers of individuals. The content can be edged-cached before activation so that is readily available for final delivery. The content can be edged case in network switches, at intermediary servers, personal area network devices or players, at internet service providers, in access points, or other places having sufficient memory for the content. For example, medical records or genomic content could be cached along many of the servers within the National Lambda Rail (see www.nlr.net).

Activating content for many thousand of people also provides opportunities for content providers. Interactions between consumers and the contemplated ecosystem can be tracked for ratings purpose where literally thousands of individuals activate content at the same time. The demographics of the individuals can be obtained based on their account information, subject to privacy restrictions, and provided to the content providers.

Due to nature of the myriad possible authentication features or authentication modalities, content providers and consumers have access to many possible ways to create authentication requirements. Such a broad spectrum of possibilities gives rise to the ability to create a sense of plausible deniability. For example, if a person is forced to give up their authentication factors, they could only reveal a small aspect of their factors, which only releases minimal content. Consider a scenario where the authentication features require a person's pen having a pen clip to be juxtaposed with their wedding band. When the pen clip is facing toward the wedding band, the person's full content can be activated. However, if the clip is away from the wedding band, a very slight change, only minimal information is activated. Therefore, the person appears to have released information in a manner where the person can plausibly deny existence of any additional information. Still further, placing the pen and ring in other orientations could active content on other electronic devices. Perhaps placing the ring at the pen tip could activate content including a text message or phone message to a police station.

Especially preferred embodiments integrate aspects, roles, or responsibilities of the multi-modal authentication and content distribution ecosystem into an operating system. Such an approach alleviates the user of an electronic device to download a dedicated application, install new software, or interact with the device in a complex manner. For example, as the electronic device collects ambient data, a recognition module can analyze the ambient data or other digital representation flowing into the device, to recognize objects or features that might be relevant to the environment in which the electronic device find itself. If necessary or desirable the operating system can offload its analysis to distal services. Further, the operating system can instantiate one or more virtual machines for presenting relevant content, possibly include executing software, where the virtual machines remain under control of the operating system or remote content providers.

As referenced much earlier in this document, content can take on many different forms. One especially contemplated form of content includes executable instructions that configure the target electronic device to take action. For example, a consumer might image a movie poster with their camera-equipped handheld gaming system. Upon proper authentication, a provider of the movie can instruct the gaming system to launch a virtual machine coupled with a transaction system. The virtual machine can be loaded with instruction that configure the gaming system to present a purchasing interface. If the user purchases the movie, the movie can be activated within the virtual machine in a secure fashion. Transactions represent only one type of action that can be taken in response to receiving content instruction. All types of actions are contemplated.

Presentation of content can comprise more than rendering images on an electronic device, playing music, or configuring the electronic device to initiate an action. In some embodiments, presentation of content can include constructing or creating three dimensional objects. For example, content can include instructions for a 3D printer capable of constructing a 3D object from resign, plastic, powers, or other materials. Example 3D printers that could be suitably adapted for use with the inventive subject matter include MakerBot™ (see www.makerbot.com), CNC machines, ZPrinter® (see www.zcorp.com), or other electronic devices capable of generating a three dimensional object. One should appreciate that the inventive subject matter is considered to include instantiating a virtual machine within a 3D printer or CNC machine under control of an external source so that the printer can generate an object while retaining rights of the content provider.

The inventive subject matter is also considered to include registration of an arrangement of valid authentication objects and possibly linking the arrangement to one or more interactions. Registration of valid authentication objects can occur through one or more techniques. One possible technique includes arranging valid authentication objects (e.g., driver's license, toy, shoe, gestures, spoken words, etc.) within the interaction space and recording the act of arranging of the objects in aggregate as a digital representation of the interaction. An authentication agent can analyze the digital representation to compile related authentication feature sets into a juxtaposition, which in turn can be stored within the authentication database. The entity that creates the arrangement can then bind the juxtaposition with desired content or actions (e.g., launching an application, conducting a transaction, sending a message, etc.). Another technique could include capturing digital representations of each valid authentication object individually and registering each of the individual objects. Then capturing one or more juxtapositions of the individual objects relative to each other where each juxtaposition can be linked to content. Consider a smart device (e.g., cell phone, tablet, phablet, computer, kiosk, ATM, etc.) security system as an example. A user could lock access to the device by registering multiple objects using different modalities of data capture. Perhaps the user might lock the device by requiring a juxtaposition among their wedding ring, spoken words, and movement of the wedding ring across a background image. Once registered, the device would then be unlocked only when the juxtaposition of the authentication features relating to the wedding ring, words, and background is detected. Thus, the user can be granted access to the operating system or features of the device (i.e., device content).

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A digital content providing system comprising:
at least one non-transitory computer-readable memory storing software instructions; and
at least one processor coupled with the at least one memory and that performs the following operations upon execution of the software instructions:
obtaining a digital representation of at least one rendered environment;
recognizing from the digital representation at least two virtual objects in the at least one rendered environment as authentication objects based at least in part on individual hash values associated with each of the at least two virtual objects, wherein the individual hash values comprise an identification of an owner of an individual virtual object calculated from a hash of at least a portion of the individual virtual object, and wherein the hash corresponds to a hash value calculated for other content identified with the owner of the individual virtual object;

deriving a juxtaposition comprising at least one of a relative position and a relative orientation among the at least two virtual objects recognized as authentication objects in the at least one rendered environment from the digital representation; and
activating digital content on a computing device unlocked by the juxtaposition.

2. The system of claim 1, wherein the at least two virtual objects comprise tokens.

3. The system of claim 2, wherein the at least two virtual objects form a collective token.

4. The system of claim 1, wherein the at least two virtual objects comprise object identifiers.

5. The system of claim 4, wherein the operations further include obtaining the digital content based on the object identifiers.

6. The system of claim 4, wherein the object identifiers include at least one of the following types of identifiers: a name, a brand, a type, a GUID, a UUID, or a serial number.

7. The system of claim 1, wherein the digital content comprises augmented reality content for the computing device.

8. The system of claim 1, wherein the digital content comprises game content.

9. The system of claim 1, wherein the juxtaposition unlocks an access level for the digital content.

10. The system of claim 9, wherein the operations further include selecting the access level from multiple access levels based on the juxtaposition.

11. The system of claim 9, wherein the access level further includes of one of the following levels: an observe level, a playback level, a promotion free level, a time shift level, a copy level, a record level, an edit level, a share level, or an interaction level.

12. The system of claim 1, wherein the rendered environment comprises at least one display screen.

13. The system of claim 12, wherein the at least two virtual objects are rendered on the at least one display screen.

14. The system of claim 1, wherein the digital representation comprises image data of the at least two virtual objects.

15. The system of claim 1, wherein the digital representation comprises multi-modal data.

16. The system of claim 15, wherein the multi-modal data includes at least two of the following types of digital data: image data, video data, sound data, motion data, biometric data, or location data.

17. The system of claim 1, wherein the digital content comprises interactive content.

18. The system of claim 17, wherein the interactive content enables a transaction related to the digital content.

19. The system of claim 18, wherein the transaction comprises a financial transaction.

20. The system of claim 1, wherein the operations further include obtaining the digital content based on authentication features of the at least two virtual objects derived from the digital representation.

21. A method for providing digital content, the method comprising:
obtaining a digital representation of at least one rendered environment;
recognizing from the digital representation at least two virtual objects in the at least one rendered environment as authentication objects based at least in part on individual hash values associated with each of the at least two virtual objects, wherein the individual hash values comprise an identification of an owner of an individual virtual object calculated from a hash of at least a portion of the individual virtual object, and wherein the hash corresponds to a hash value calculated for other content identified with the owner of the individual virtual object;

deriving a juxtaposition comprising at least one of a relative position and a relative orientation among the at least two virtual objects recognized as authentication objects in the at least one rendered environment from the digital representation; and activating digital content on a computing device unlocked by the juxtaposition.

22. A non-transitory computer-readable medium having software instructions for providing digital content stored thereon which, when executed by at least one processor, cause the at least one processor to perform operations comprising:

obtaining a digital representation of at least one rendered environment;

recognizing from the digital representation at least two virtual objects in the at least one rendered environment as authentication objects based at least in part on individual hash values associated with each of the at least two virtual objects, wherein the individual hash values comprise an identification of an owner of an individual virtual object calculated from a hash of at least a portion of the individual virtual object, and wherein the hash corresponds to a hash value calculated for other content identified with the owner of the individual virtual object;

deriving a juxtaposition comprising at least one of a relative position and a relative orientation among the at least two virtual objects recognized as authentication objects in the at least one rendered environment from the digital representation; and activating digital content on a computing device unlocked by the juxtaposition.

\* \* \* \* \*